(12) United States Patent
Curlett

(10) Patent No.: US 10,641,073 B2
(45) Date of Patent: May 5, 2020

(54) METHOD AND SYSTEM FOR SUBSURFACE RESOURCE PRODUCTION

(71) Applicant: Curlett IP LLC, Cody, WY (US)

(72) Inventor: Harry Bailey Curlett, Cody, WY (US)

(73) Assignee: Curlett IP LLC, Cody, WY (US)

( * ) Notice: Subject to any disclaimer, the term of this patent is extended or adjusted under 35 U.S.C. 154(b) by 105 days.

(21) Appl. No.: 15/115,619

(22) PCT Filed: Jan. 26, 2015

(86) PCT No.: PCT/US2015/000018
§ 371 (c)(1),
(2) Date: Jul. 29, 2016

(87) PCT Pub. No.: WO2015/116343
PCT Pub. Date: Aug. 6, 2015

(65) Prior Publication Data
US 2017/0175505 A1      Jun. 22, 2017

Related U.S. Application Data

(60) Provisional application No. 61/934,041, filed on Jan. 31, 2014.

(51) Int. Cl.
*E21B 43/24* (2006.01)
*E21B 43/26* (2006.01)
(Continued)

(52) U.S. Cl.
CPC .......... *E21B 43/2401* (2013.01); *E21B 43/20* (2013.01); *E21B 43/26* (2013.01); *E21B 43/121* (2013.01)

(58) Field of Classification Search
CPC .... E21B 43/2401; E21B 43/26; E21B 43/003; E21B 28/00
See application file for complete search history.

(56) References Cited

U.S. PATENT DOCUMENTS 3,480,805 A * 11/1969 Yerrell ................... H02K 44/10
                                                            310/11
3,522,846 A *  8/1970 New ..................... E21B 43/2401
                                                            166/303

(Continued)

FOREIGN PATENT DOCUMENTS

WO        2015/116343 A1      8/2015

*Primary Examiner* — Jennifer H Gay
(74) *Attorney, Agent, or Firm* — Wilson Sonsini Goodrich & Rosati

(57) ABSTRACT

A means to generate increasing geological permeability to produce greater volumes of various subsurface geological resources when compared to the current conventional production methods is disclosed. The means include a Pulsed Power Plasma Emitter System capable of substantially increasing the available electrical energy for use in high power compression surge currents that can be discharged and transmitted to power a simplified downhole Plasma Emitter Tool subsystem. The simplified downhole Plasma Emitter Tool sub-system is capable of generating a broad range of precisely controlled magnetohydrodynamic plasma spark discharges that produce a broad range of high power electromagnetic, acoustic and hydrodynamic surge waves. These powerful surge waves are generated at energy and power levels that are necessary to physically modify all types of geological formation permeability and to energize the mobilization of various subsurface fluids and fluidized resources.

18 Claims, 11 Drawing Sheets

(51) Int. Cl.
*E21B 43/20* (2006.01)
*E21B 43/12* (2006.01)

(56) References Cited

U.S. PATENT DOCUMENTS

| | | | | |
|---|---|---|---|---|
| 3,679,007 | A * | 7/1972 | O'Hare | E21B 7/15 |
| | | | | 175/16 |
| 4,343,356 | A * | 8/1982 | Riggs | E21B 36/04 |
| | | | | 166/248 |
| 4,466,484 | A | 8/1984 | Kermabon | |
| 4,741,405 | A * | 5/1988 | Moeny | E21B 7/15 |
| | | | | 175/16 |
| 4,997,044 | A | 3/1991 | Stack | |
| 5,018,590 | A | 5/1991 | Weldon | |
| 5,106,164 | A * | 4/1992 | Kitzinger | E21B 7/007 |
| | | | | 166/63 |
| 5,573,307 | A * | 11/1996 | Wilkinson | E21B 7/15 |
| | | | | 299/14 |
| 6,227,293 | B1 * | 5/2001 | Huffman | E21B 28/00 |
| | | | | 166/177.2 |
| 8,220,537 | B2 | 7/2012 | Leon et al. | |
| 9,394,776 | B2 * | 7/2016 | Leon | E21B 43/26 |
| 9,748,740 | B2 * | 8/2017 | Delchambre | H01T 1/22 |
| 2001/0011590 | A1 * | 8/2001 | Thomas | E21B 43/003 |
| | | | | 166/248 |
| 2005/0150688 | A1 * | 7/2005 | MacGregor | B23K 10/00 |
| | | | | 175/16 |
| 2005/0267719 | A1 | 12/2005 | Foucault | |
| 2008/0237499 | A1 | 10/2008 | Auchterlonie | |
| 2009/0050371 | A1 * | 2/2009 | Moeny | E21B 10/00 |
| | | | | 175/57 |
| 2010/0000790 | A1 * | 1/2010 | Moeny | E21B 7/15 |
| | | | | 175/16 |
| 2010/0328000 | A1 | 12/2010 | Haramein | |
| 2012/0168177 | A1 * | 7/2012 | Moeny | E21B 7/15 |
| | | | | 166/380 |
| 2014/0008073 | A1 | 1/2014 | Rey-Bethbeder et al. | |
| 2014/0027110 | A1 * | 1/2014 | Ageev | H05H 1/52 |
| | | | | 166/249 |
| 2014/0060814 | A1 * | 3/2014 | Leon | E21B 43/26 |
| | | | | 166/177.5 |
| 2014/0262226 | A1 * | 9/2014 | Storslett | E21B 28/00 |
| | | | | 166/248 |
| 2015/0114623 | A1 * | 4/2015 | Owens | E21B 43/26 |
| | | | | 166/248 |
| 2016/0017663 | A1 * | 1/2016 | Moeny | E21B 7/15 |
| | | | | 175/327 |
| 2016/0024849 | A1 * | 1/2016 | Kocis | H05H 1/40 |
| | | | | 175/16 |
| 2017/0067292 | A1 * | 3/2017 | Bayol | E21B 41/0085 |
| 2017/0175505 | A1 * | 6/2017 | Curlett | E21B 43/2401 |

* cited by examiner

METHOD AND SYSTEM FOR SUBSURFACE RESOURCE PRODUCTION

METHOD AND SYSTEM FOR SUBSURFACE RESOURCE PRODUCTION CROSS REFERENCE

This application is a U.S. National Phase of International Application No. PCT/US2015/000018, filed Jan. 26, 2015, which claims the benefit of U.S. Provisional Application No. 61/934,041, filed Jan. 31, 2014, which is incorporated herein by reference in its entirety.

BACKGROUND OF THE INVENTION

This invention is intended for use in the hydrocarbon, geothermal and mining resources industries, and generally relates to methods and apparatus that are utilized for modifying subsurface resource formation permeability and providing means for the movement of formation fluids, materials and/or other fluids and/or other materials within and/or through the modified permeability within a resource bearing formation. More particularly, the invention relates to such methods and apparatuses that use the energy released by high power Magnetohydrodynamic Plasma Spark (MPS) discharges to alter the productivity of a resource bearing formation. The energy released from the high power MPS discharges generates nonlinear, directed, wide band and elastic controlled periodic oscillations that affect the resource bearing formation material and fluids in varying but complimentary ways to act in altering productivity of said resource bearing formation.

The invention further relates to modifying the productive capacity of resource bearing formations that have been drilled with production and/or injection wellbores into resource bearing formations that are conventionally classified or commonly known as new, mature, and/or depleted resource bearing formations. Said resource bearing formations may be either on-shore or off-shore. The wellbores drilled to access the resource bearing formations may be drilled as vertical, directional, horizontal or any combination thereof. The invention utilizes high power MPS discharge produced oscillations, generated within said wellbores, to modify the permeability of said resource bearing formations and thereby modify the fluidization, viscosity, mobility and/or other physical characteristics of resource bearing formation fluids and/or materials to enhance production of chemicals, chemical compounds (such as hydrocarbons), heat energy and/or resource materials.

The invention may find useful applications in environmentally positive related types of processes, such as increasing the productive capacity of all types of geothermal energy bearing formations, carbon dioxide injectable formations, waste disposal injectable formations and formation for the conservation of various materials.

An exemplary description of the method and apparatus of the present invention will be described in reference to chemical compound (hydrocarbon) resource production, and more specifically, oil production. It is understood that the described method and apparatus can be utilized and/or modified to be utilized to produce almost any subsurface fluid and/or material that can be fluidized as a producible resource such as water, hydrocarbons, geothermal heat energy, diamonds, potash, and like resources.

Oil production operators attempt to produce the maximum volume of their oil resource reserves within a hydrocarbon bearing formation at the lowest cost during the formations primary production phase. A production wellbore's primary production phase is defined as the phase during which the in situ formation pressure drive mechanism will force the hydrocarbon to a wellbore. Once the formations production drive mechanism can no longer economically force the hydrocarbons to the wellbore, more expensive and complicated secondary and tertiary technology methods are employed if additional hydrocarbons are to be produced into a wellbore. A typical cause for resource reservoirs to lose production related drive pressures is the resource formation permeability becomes partially or fully plugged over time, thereby isolating the any production drive pressure remaining from the wellbore. As numerous oil bearing reservoirs have become pressure depleted worldwide, advanced methods of enhanced production of the oil in place needs to be developed to extract economically significant amounts of technically non-producible hydrocarbons left in the reservoirs being produced by conventional primary, secondary, and tertiary means.

As is commonly known within the oil and gas industry, the historical average level of primary oil production from typical wells drilled into conventionally completed oil bearing formations has been approximately 30% and <10% from wells drilled into unconventional oil bearing formation wells.

The primary causes for the low percentage level of oil production is the loss of useable drive pressure through pressure depletion or produced particle and/or chemical precipitate clogging or completely plugging the productive formation's permeability. The result of undesirable drilling or completion processes and/or the cumulative effects of reservoir production material swelling, movement and/or the chemical generation of precipitous particle accumulation of materials within the oil bearing formation tend to reduce or totally inhibit the oil production process. Specifically, particle movement and/or precipitate clogging of the near-wellbore area permeability, in particular, is one of the most common causes for the reduction in oil production over time.

In additional to conventional mechanical completion processes, numerous methods and apparatus for enhancing hydrocarbon production have been researched and applied with varying degrees of success. Chemical, microbiological, thermal-gas-chemical and similar methods generally rely on using various agent-assisted processes, including: injection of steam, foam surfactants and/or air, the latter being accompanied by low-temperature or high-temperature oxidation, in situ formation of emulsions, directed asphaltene precipitation, chemical thermal desorption, selective chemical reactions in light oil reservoirs and heavy oil deposits, chemical agent assisted alterations of phase properties, including wettability and interfacial tension, and alkaline-surfactant polymer flooding are illustrative.

Limited and temporary remedially enhanced oil production has been achieved through stimulating the formation, formation fluids and/or wellbore casing perforations with hydro-mechanical and/or electrically generated wellbore fluid oscillation effects. Movement of near field permeability plugging and/or blockage material, resulting from cumulative production material or chemical deposits, and increased wellbore oil inflows have been achieved by means of agent-free oscillation stimulation apparatuses. These oscillation producing apparatuses include mechanical (hydro-mechanical) and electric (electromagnetic, ultrasonic, acoustic, and electrohydraulic) emitter devices, as well as combinations thereof.

Oscillation producing apparatus utilize hydrodynamic oscillation emitters such is typical of that taught in U.S. Patent Application Publication No. 2003/0201101 authored by Kostov et al and U.S. Pat. No. 4,060,128 issued to Wallace, or electric plasma oscillation emitters such as is typical of that taught in U.S. Pat. No. 4,345,650 issued to Wesley et al and U.S. Pat. No. 4,074,758 issued to Scott. Both type of oscillation emitters are typically deployed within a wellbore, positioned at depth and operated at a producing formation interval. These tools operate to emit oscillatory vibrations into the wellbore ambient fluid and subsequently into the productive formation through wellbore casing perforations or through an open-hole section of the wellbore. The wellbore fluid, typically a liquid, provides a good hydrodynamic coupling media to transmit the oscillatory vibrations from the emitter into the geological formation.

It is commonly known, that based on energy density, the potential to develop the highest power oscillations is greatest using electric plasma oscillation emitters. These electric plasma oscillation emitters are typically deployed into, positioned, moved from point to point within the wellbore and supplied with power by means of a spooled wire line system situated at the surface.

The typically completed wellbore diameters are a nominal 10.2 cm or less for cased holes or a nominal 15.24 cm for open hole completions. These are the most common wellbore diameters due to established economics. These wellbore diameter constraints severely limit the physical size of any mechanical and/or electrical oscillation emitter systems that can be deployed downhole.

The universally small completed wellbore diametrical constraint has limited the ability to develop high energy density pulsed power storage means to operate electrical oscillation emitters that are deployed downhole for use. Specifically, the wellbore diametrical constraint typically limits the practical downhole energy storage capacity of the prior art electrical oscillator systems to ≤2.0 kJ. While a few of the prior art teachings discuss or infer the use of larger downhole energy storage means, none of them describe the specifications able to achieve energy storage capacity above 2.0 kJ. Further, only recently have plasma oscillation emitters become commercially available and they operate at the ≤1.5 kJ energy level as advertised by Blue Spark Energy, Inc.'s and Propell Technologies Group's internet presentations.

At low energy storage levels (≤2.0 kJ), the prior art electric plasma oscillation emitters are practically limited to generating only minor near field formation modifications and/or low energy production stimulation. The prior art plasma oscillation apparatus have been unable to achieve sustained economically significant production enhancement due to their limitation of low energy density coupled with the complexities of reliably operating intricate mechanical and/or electro-mechanical systems within the deployed tool that must be operated in a harsh downhole environment.

Exemplary of prior art electric plasma oscillators is U.S. Patent Application Publication No. 2014/0027110 A1 invented by Ageev et al which discloses an electric plasma emitting oscillation apparatus and method to provide a wellbore centric enhancement of oil production by means of the remediation of the near-field filtration properties of the productive formation. The method comprises the production of wellbore centric plasma generated shock and hydrodynamic waves travelling radially within an ambient wellbore liquid as the result of generating a brief, but powerful plasma bubble. The plasma bubble is generated by the explosive electrical shorting of a calibrated metal wire filament located between two submerged electrodes. Ageev's teachings focus on the explosive generation of a plasma bubble that instantaneously emits a shock wave oscillation with hypersonic acoustical velocity and a slower velocity hydrodynamic pulse wave. The purpose of operating this emitter tool is to utilize the shock wave and hydrodynamic oscillations to dislodge production related blockages from within the casing perforations and/or the near field formation permeability and the subsequent inflow movement of the blockage material into the wellbore. The action of dislodging and removal of the blockage material provides a temporary increase in the productive inflow of formation fluids into the wellbore. If successful in stimulating the formation, the increased inflows are temporary, lasting from several days to several months. In operation, the described system deploys the downhole plasma emitting tool system into the wellbore by means of a surfaced located truck mounted spooled wire line system. The surfaced located conventional power supply system within the wire line truck provides an electrical current to charge to a downhole capacitor based pulsed power system transmitted through conductors within the deployment wire line cable. The downhole plasma emitter tool system employs several electrical and/or electronic sub-systems for charging, energy storage, and controlling the firing and charging sequences of the plasma emitter tool system. The downhole capacitor based energy storage, electronic control and firing circuits, circuit electrodes, and the wire filament replacement system are all contained within the downhole emitter tool system that is wire line deployed to a target formation depth within the wellbore. The various prior art teachings of wire line deployment of the plasma emitter systems along with its energy storage sub-system into the wellbore limits the energy storage capacity, the operable temperature, and the deployment angle capabilities of the apparatus. Due to the size limitations of the small plasma emitter's capacitor energy storage sub-system, the energy and power levels and wave forms of the shock waves that this type of plasma emitter can generate is severely limited in its range. The plasma emitted shock wave power and wave form are critical to effectively generating formation modifications such as formation filtration and fracturing as describe by Ageev. The low energy storage capacity causes critical tradeoffs between generating relatively high power, high frequency or relatively low power, low frequency shock waves which severely limits the range and magnitude of the formation effects and the radial distance the shock waves can be effective in modifying the productive formation properties. The cumulative effect of the low energy capabilities of the apparatus as taught by Ageev, is that it is only effective in generating near-field filtration effects and has very little effectiveness, if any, in fracturing the formation. Further, and again, due to the low energy density limits on power and wave forms, this category of apparatus is only effective in generating very near-field formation filtration enhancements that are temporary in nature. One operational problem identified with these types of plasma emitter systems is that the sacrificial metal conductor filament as taught by Ageev, suffers high energy losses, typically 15 to 50% of the stored energy at the stage of conductor heating due to melting, evaporation, and high optical radiation losses. These stated energy losses drastically decrease the acoustic and hydrodynamic shock wave intensity due to the relatively smaller volume plasma. Another operational problem occurs with this type of plasma emitter due to the need for continuously replacing the sacrificial metal wire filament after each plasma generation sequence. The filament replacement requires a complex electro-mechanical filament replacement sub-system means. Such electro-mechanical means generally do not operate reliably under the typically harsh downhole environment (high pressure, high temperature, and corrosive fluids) coupled with repeated high power electromagnetic, acoustic and/or hydrodynamic shock generating events. Further, these mechanical and/or electro-mechanical filament replacement systems typically lack reliability due to the surface rupture or sticking of the filaments at the point where they come into contact with the current conducting parts before, during and/or after the plasma generation. Still further, the materials of the current conducting parts undergo substantial material ablation due to the filament related dynamic vaporization and erosion processes as the plasma is formed. The described system is therefore operationally limited to near-field remedial filtration treatment of the formation due to energy limitations; can operate only in relatively low bottom-hole temperatures due to temperature-limited electronic equipment failures, and can only operate in non-horizontal wellbores due to lack of the ability to push the tool horizontally to the bottom of the hole without third party equipment. The described equipment and operational related short comings eliminate many thousands of existing wellbores and hundreds of thousands of potential new wellbores from applying the described electrical plasma oscillation emitter as taught by Ageev.

In additional to the Ageev teachings, the following list of prior art references teaches apparatus and methods similar to that taught by Ageev in that they also attempt to modify the productive formation permeability (filtration) and/or mobilize oil inflow and/or mobilize oil radially towards adjacent wellbores utilizing low energy storage capacity for producing pulsed plasma discharges. The prior art exclusively teaches the use of downhole capacitors to provide pulsed power to the electric plasma oscillation emitter systems. These additional references provide teachings, insights and/or support for the descriptions of the faults and shortcomings of the low energy density electric plasma oscillators as discussed concerning the Ageev patent application. These additional references are as follows:

a) U.S. Pat. No. 4,343,356 issued to Riggs et al
   b) U.S. Pat. No. 4,345,650 issued to Wesley et al
   c) U.S. Pat. No. 4,667,738 issued to Codina
   d) U.S. Pat. No. 4,997,044 issued to Stack
   e) U.S. Pat. No. 5,004,050 issued to Sizonenko et al
   f) U.S. Pat. No. 6,227,293 issued to Huffman et al
   g) U.S. Pat. No. 8,220,537 issued to Leon et al Exemplary of another prior art electric plasma oscillator is U.S. Patent Application Publication No. 2014/0008073 A1 invented by Rey-Bethbeder et al which discloses a typical wire line deployed downhole electric plasma oscillation emitting apparatus and method to provide of enhancement of hydrocarbon production by means of the wellbore centric fracturing of the near-field productive formation to an approximate 30 m radius along the axis of a horizontal wellbore. Interestingly, one of the rudiments of this teaching is the integrated use of electric fracturing before, during or after applying conventional static hydraulic fracturing. Bethbeder teaches the use of up to 2.0 MJ of energy to operate the plasma emitter, but fails to teach a means to achieve the downhole storage of the 2.0 MJ of energy within the downhole plasma emitter described. The typical wellbore diameter constraints of either vertical or horizontal wellbores renders a downhole capacitor system storage of 2.0 MJ of energy unfeasible as is discussed concerning the Ageev patent application and explanations found in the additional downhole plasma emitter prior art references. Further it is common knowledge that it would be unworkable to supply an electrical energy surge of 2.0 MJ of energy from a surface location through a long wire line due to the physical limitations of current wire line insulation and temperature related strength technology for typical oilfield wellbore deployable wire lines. Still further, Bethbeder was silent about the prohibited cost associated with drilling and completing a significantly larger diameter wellbore that would be required to practically accommodate the diametrical dimensions of a downhole tool necessary to include a capacitor sub-system capable of storing up to 2.0 MJ of energy. The energy density of capacitors has been the key obstacle in deploying increased capacitor energy storage systems within downhole plasma emitter tools based on wire line deployment. Additionally, Bethbeder's teachings infer being able to fracture a formation by means of a plasma discharge at the calculated energy compression level 0.032 MJ/µs at a corresponding power compression of 0.032 MW/µs for approximately 10,000 µs (0.01 seconds) at an initial shock wave frequency of approximately 100 Hz in an omni directional manner. The total energy per plasma shot described by Bethbeder would be approximately 0.32 GJ/plasma discharge shot which translates to a power of approximately 1.34 tons of TNT dynamite. Bethbeder teaches that this level of power could generate high density formation fracturing to a nominal 30 m radius along a horizontal wellbore. Drawing from legacy wellbore "shooting" field experiments with chemical explosives, and more specifically the "Gasbuggy Project", the first underground nuclear explosion field test associated with the U. S. Government Plowshare peaceful nuclear development program, in which a 120 TJ (29 kt of TNT) explosion only managed to generate a 24 m diameter by 102 m rubblized geological formation chimney. Therefore, as a practical matter, even at the inferred maximum energy compression of 0.32 GJ/plasma (1.3 t of TNT) discharge, as taught by Bethbeder, the described apparatus would not be able to achieve his stated 30 m radial zone of rubblized formation along the axis of a horizontal wellbore no matter how many repetitive discharges were to be used. The levels of energy taught by Bethbeder are inconsistent with the significant body of public domain information available to compare energy levels in generating near-field wellbore fracturing as described by Bethbeder. Bethbeder also teaches the use of electric fracturing in conjunction with static hydraulic fracturing, before, during or after static hydraulic fracturing. It is common knowledge that wellbore centric explosively generated (chemical and/or electric) compressive shock waves radially compact the formation until a radially stratified threshold density has been achieved within the near-field geological formation. At this point the shock wave is materially reflected back towards the source of the shock waves and travels through the formation material as a tension stress force thereby failing the formation material in its weakest stress mode. The effect is one of rubblizing the formation material interior to the point of shock wave reflection. This effect is known as the development of a radial formation densification that forms a Radial Stress Cage (RSC) that surrounds the wellbore as a result of wellbore centric explosive events. The generally instantaneous formation radially stratified densification that takes place during the formation of the RSC would force any existing or developing static hydraulic macro-fractures to instantaneously collapse and close due to formation dilatation, densification and radial compaction resulting from the electric fracturing process. The RSC within the formation would prevent any static hydraulic generated macro fracture enhancement. Further, if the static hydraulic fracturing was attempted after the electric fracturing, the static hydraulic fracturing would be ineffective in generating the intended long radial macro fractures as described by Bethbeder. This is due to the RSC generated by the electric fracturing would act as a barrier to static hydraulic fracturing pressure as the RSC would have the effect of elevating the necessary static fracturing hydraulic pressure, necessary to fracture through the RSC area of formation densification, to an unworkable hydraulic pressure level for the safe operation of either the hydraulic fracturing equipment or the wellbore equipment. Further, the static fracture pressure would be spread over a significantly larger radial surface area due path-of-least-resistance static hydraulic pressure spreading within the electrical fracture rubblized zone along the wellbore axis thereby requiring significantly increased volumes of fracturing fluids. Still further, any desired control of the placement of static macro fractures would be lost under these circumstances. Thus the teachings of Bethbeder a) fail to describe a practical means of providing up to 2.0 MJ downhole energy storage; b) fails to describe sufficiency of downhole energy storage to be able to conduct near-field electrical formation fracturing results as described by Bethbeder; c) joins the categorical ranks of low energy pulsed plasma emitter oscillation means and d) describes an impractical and ineffective method of attempting to combine the use of electrical and static hydraulic fracturing.

The prior art has described low energy pulsed plasma emitter oscillator systems and methods. These low energy pulsed plasma emitter oscillator systems appeared to have great promise but have either been impractical to economically deploy or relegated to economically insignificant niche operations due to low energy levels available. None of the prior art has provided an entirely workable or an economically significant means of generating formation modifications and/or resource mobilization within a resource bearing formation through the use of electric plasma oscillators. It is common industry knowledge that a great need for enhanced sub-surface resource production exists. There follows a commensurate opportunity to provide a high energy pulsed plasma emitter oscillator apparatus and methods of use that can generate economically significant resource formation modifications and resource mobilization. Therefore, what is needed is a high energy pulsed plasma emitter system that can cost effectively generate a range of near and far field formation modifications and formation fluid effects that promote rapid resource mobilization and high volume ultimate resource production.

SUMMARY OF THE INVENTION

Aspects of the embodiments of the present invention provide a method and apparatus to generate an economically significant increase in the ultimate volume and the rate of production of the Oil in Place (OIP) within hydrocarbon bearing resource formations when compared to conventional means of production. The production enhancement is achieved through the combination of generating an aggregately increasing formation matrix permeability and fluid mobility energization at a level that will support the circulation of fluid between two or more adjacent wellbores. Achieving inter-wellbore circulation provides a means to induce energetic circulatory sweeping and production of the increased permeability density related hydrodynamically accessible OIP within a hydrocarbon bearing formation. Additionally, the inter-wellbore circulation provides a means to produce the hydrocarbon resource independent from the geological formation drive system type, existing and future condition.

A low cost per shot high power Magnetohydrodynamic Plasma Spark (MPS) is used to generate an aggregately increasing density of formation permeability and fluid mobility energization. The plasma MPS concomitantly produces precisely formed, narrowly beamed, energetic electromagnetic, acoustic and hydrodynamic surge waves that are beamed between two or more wellbores in repeated sequential and/or bidirectional manner. The MPS is produced by a novel high energy pulse plasma emitter (PPE) system of the present invention. A high energy pulse plasma emitter system is defined as a system that is capable of supplying an electrical surge energy of greater than 2.0 kJ of energy to a downhole pulsed power emitter to produce a high power MPS. The high energy pulse plasma emitter system of the present invention is capable of storing and supplying electrical energy surges ranging from the lowest used in the described prior art (<2.0 Id) to unprecedentedly high energy densities into the GJ range. The novel high energy pulse plasma emitter system can deliver a broad range of precisely controlled electrical power surge currents to the PPE. The high energy pulse plasma emitter system can be adjusted to produce MPS concomitantly generated electromagnetic, acoustic and hydrodynamic energy surge waves that have the necessary wave forms and amplitudes that can be applied in a variety of ways to produce extensive high density bulk formation permeability modifications and fluid energization at great distances from the high energy pulse plasma emitter system. These concomitantly generated but different high power wave types, travelling at different velocities act on the formation in different but serially complimentary ways. Various formation effects generated by the MPS generated waves have been discussed in the prior art cited elsewhere in this specification and such references are hereby incorporated in their entirety and made a part hereof. Further, these waves can be generated as either non-shock or shock waves. These energetic waves act upon the formation to impart their energy into the formation and the various fluids in different ways. The actions of the high energy pulse plasma emitter dynamic energy waves acting upon the hydrocarbon bearing formation produce a high density of interconnected micro and mini scale fractures that form circuitous macro scale permeability pathways within the bulk formation matrix. Each time a high energy pulse plasma emitter MPS is discharged; additional micro and mini scale fractures are generated within the bulk formation and interconnected into macro scale permeable fracture systems. The result is a progressive change of the aggregate circuitous pathways of macro scale permeability pathways. Repeated generation of the high energy pulse plasma emitter MPS continues to progressively increase the fracture density and change the macro scale permeability pathways thereby providing time varying and aggregately increasing hydrodynamic access to greater volumes of the OIP. The development of inter-wellbore macro scale permeability pathways provides the ability to induce inter-wellbore circulatory flow by injecting fluid from the surface of one well to hydraulically flush and produce the hydrodynamically assessable oil into at least one or more adjacent wellbores. In combination with the induced inter-wellbore flow, a hydrodynamic pulse generated by the high energy pulse plasma emitter MPS cavitation bubble expansion and imploding process provides a pair of serially additive energetic hydraulic pulse waves that acts hydrodynamically on the formation fluids to provide a jump-state velocity related pressure surge front that energizes the formation fluids to surge through the circuitous permeability pathways that are concomitantly being dynamically modified. Thus, as the dynamically changing macro scale permeable pathways adjust with each production of an high energy pulse plasma emitter MPS, increasing volumes of oil are exposed and surge flushed into an adjacent production wellbore to be produced to the surface.

The high energy pulse plasma emitter system's downhole equipment is initially deployed within each of two or more adjacent wellbores situated within the same hydrocarbon bearing resource formation. The novel high energy pulse plasma emitter system comprises an electrical power circuit and a fluid injection and processing circuit. The over-all high energy pulse plasma emitter system includes a) a simplified pulsed plasma emitter tool retaining two electrodes that form a spark gap between them as is typically known in the prior art; b) a Dual Concentric Tubular (DCT) deployment system with which to deploy and provide electrical power and fluid circuits for the operation of the downhole pulse plasma emitter tool; c) a Wellhead Spool (WS) system to accommodate the running and positioning the DCT system; d) a surfaced based Compensated Alternator Pulsed Power (CAPP) system with various command and control subsystems; e) a surfaced based Fluid Processing System (FPS) to supply and process the various operating, injection and production fluids; and f) the various interconnects that integrate the over-all system.

A simplified description of the preferred embodiment and operation of the high energy pulse plasma emitter system to produce a high energy pulse plasma emitter MPS in now described. The CAPP system equipment rotationally spins up a Compulsator Pulsed Power Generation system to generate and mechanically store a high density of electrical energy that can be instantaneously discharged in the form of a precisely controlled electrical energy surge. As the Compulsator is spun up, a specialized fluid mixture is pumped through the center of the DCT inner conduit to and through the upper pulsed plasma emitter electrode where the special fluid is catalyzed to prepare a spark gap fluid channel that is at least partially ionized between the pulsed plasma emitter electrodes. Next, the CAPP system discharges a HVDC electrical surge current that is transmitted through interconnects and along the large cross sectional area inner DCT tubular. The electrical surge current is thereby instantaneously pumped into the ionized spark gap channel and generates an explosively expanding MPS bubble within the confining ambient wellbore liquid. Any electrical current not absorbed in the generation of the MPS is transmitted into the lower electrode, through the PPE outer housing, through the outer conduit of the DCT, and is captured by the CAPP system to be used or stored as desired. The high energy MPS discharge concomitantly generates electromagnetic, acoustic and hydrodynamic energy waves that are transmitted through the confining ambient wellbore fluid to penetrate into and impart their energies into the geological formation as is unique to each wave type, form, power, and energy level. Thus the unique high energy pulse plasma emitter system provides the foundational means for applying a broad range of very precisely controlled high energy MPS produced surge waves to conduct the geological formation modifications and fluid mobility energization of the present invention.

The repetitive MPS discharges progressively generate an aggregately sufficient amount of inter-wellbore permeability modifications that collectively permit the ability to circulate a fluid through the geologic formation between two or more wellbores. In combination with the continued repetitive generation of MPS discharges, fluid injection is from one wellbore into and through the geologic formation permeability begins. This combination of events provide the means circulate between the wellbores thus providing enhanced production volume and rate of production through steady and fluctuating fluid hydrodynamics effectively generating an efficient artificially induced fluid sweeping and production drive combination of mechanisms acting within the geological formation. The combination of injected fluid pressure in conjunction with the hydrodynamic surge pressure generated by the action of the MPS bubble dynamics, produces a means to flush and sweep the formation fluids and the injection fluids through the formation permeability into the hydrodynamically connected adjacent wellbore. A surface located FPS provides the means to circulate the adjacent wellbores collectively in a closed-loop manner. The FPS provides the means to inject and/or circulate fluid into the inter-well permeability, circulate the fluid to sweep the formation fluids and fluidized materials to an adjacent wellbore where the circulatory flow hydraulically forces the heterogeneous mixture of fluids and fluidized materials to the surface where it is captured and processed by the FPS. Most alternate means used to produce or artificially lift the production fluids from the production mode wellbore can be integrated into the system of the present invention (e.g.—pressure differential jet pumping, downhole pumps, etc.). The FPS captures the fluidized mixture of fluids and materials produced from the production mode wellbore to processes it for marketable materials, reusable materials, and disposable materials. These various produced materials are processed, reused, stored, marketed and/or disposed of in a manner that is commonly used in conjunction with hydrocarbon drilling, completion and production operations. Placing the high energy pulsed plasma system into adjacent wellbores provides the means to generate repetitive, bidirectional formation permeability modifications and fluid mobility energization on a generally continuous basis as desired. The relatively low capital, deployment and operational costs of the high energy pulsed plasma system results in a low cost per MPS discharge. The low cost per MPS discharge provides the ability to sustain the discharges, on a generally continuous basis, throughout the total geological formation production phase.

In one aspect of the embodiments of the present invention, the high energy pulsed plasma system provides a low cost means to progressively generate far field permeable fracture pathways by the repeated application of high energy MPS discharges that generate electromagnetic, acoustic and hydrodynamic energy surge waves. The energy surge waves act to generate and interconnected micro, mini and macro scale formation fractures through fracturing, hydro-shearing, dilatation, spallation and/or work hardening effects at all levels within the typically heterogeneous geological formation.

In another aspect of the embodiments of the present invention, the high energy pulsed plasma system provides a means to generate a permeable fracture pathway breakthrough between two or more wellbores by the repeated application of inter-well, bi-directional, high energy MPS discharge generated electromagnetic, acoustic and hydrodynamic energy surge waves. The energy surge waves act bidirectionally between two or more wellbores to generate and interconnect micro, mini and macro scale formation fractures through fracturing, hydro-shearing, dilatation, spallation and/or work hardening effects.

In another aspect of the embodiments of the present invention, the high energy pulsed plasma system provides a means to generate a progressive and aggregately increasing density of interconnected micro, mini and macro scale formation matrix fractures between two or more well bores resulting in providing continually evolving changes to the permeable pathways that thereby increase the number of the pore spaces that can be hydrodynamically exposed and accessed providing a means to produce the pore fluids within the pore spaces.

In another aspect of the embodiments of the present invention, the high energy pulsed plasma system is designed so as to be able to combine induced inter-wellbore fluid circulation in addition to the hydrodynamic effects resulting from the repetitive MPS discharges. The combination of high energy pulsed plasma system generated hydrodynamic surge waves, concurrently produced in conjunction with the inter-wellbore forced fluid circulation process, provides an enhanced production drive form and energy level that is an improvement over the production drive form and energy level that was available before the stimulation by the process of the present invention.

In another aspect of the embodiments of the present invention, a means to circulate a fluid through the formation matrix from one well bore to one or more adjacent well bores in such a manner as to minimize hydraulic fingering such as is known to occur during the conventional formation flooding practices.

In another aspect of the embodiments of the present invention, a portable, high energy density, rotary-mechanical, surge pulse power electrical energy generation and kinetic energy storage means is provided that can be operated to generate repetitive, high cycle rate, high power current surges to power the generation of high power MPS discharge means placed within a confining subsurface wellbore to produce a high energy electromagnetic, acoustic, and hydrodynamic surge waves within the subsurface well bore and the surrounding geological formation.

In another aspect of the embodiments of the present invention, the use of a high energy density rotary-mechanical Compensated Pulsed Alternator, more commonly known as a Compulsator, along with its typical computer and software controlled data logging and command and control systems is taught vs. the prior art teachings of the exclusive use of a capacitor based pulsed power system as the means to store and discharge electrical surge energy to power the generation of MPS. The prior art exclusively teaches the use of a capacitor system for powering of the downhole pulsed plasma emitters described by them. The capacitor systems as taught in the prior art are practically unsuitable for field deployment as high energy density pulsed power sources that are required for the type of geological formation effects as anticipated by the present invention. Further, the low energy densities of the prior art capacitor based systems has been instrumental in the lack broad acceptance associated with the downhole pulsed plasma treatment of sub-surface resources. The high energy pulsed plasma system of the present invention provides a practical and straight forward means to deliver high cycle count, high power electrical surge currents to power high energy density MPS discharges and capture the potential benefits envisioned for application of pulsed plasma emitter technology to geological formation production enhancement.

In one embodiment of the present invention, a systemic means to efficiently transmit very high electrical power surge currents from a surface based pulsed power source through a relatively large cross sectional diameter transmission tubular to PPE placed within a wellbore; to insulate and cool the power transmission tubular—thereby enabling high power electrical surge current to be repeatedly transmitted over long distances to power a PPE system placed downhole; to thermally stratify the ambient fluid(s) proximal to the PPE; to hydraulically clear any residual gas and/or debris near the PPE tool—thereby ensuring a good coupling between the MPS surge waves, the ambient wellbore fluid and the wellbore formation wall, is provided.

In another aspect of the embodiments of the present invention, an electrical transmission tubular provides downhole tool deployment and retrieval means to place and retrieve a PPE tool and/or any multi-level array of PPE and/or induction apparatus into and from the wellbore for the purposes of placing, operating, repositioning, adjusting and/or maintaining the various apparatus and/or tool system(s).

In another aspect of the embodiments of the present invention, a systemic means is provided to adjust or change the relative position of the plasma generation tool within the well bore to operate the tool at various measured depths and/or specific azimuthal positions (in the case of using a MPS concentrator means in conjunction with the PPE) within the wellbore.

In another aspect of the embodiments of the present invention, a chemical reaction means is provided to generate at least a partially ionized fluid channel within a spark gap positioned between live and ground electrodes of the present invention. The chemical reaction means will induce at least a partially ionized spark gap channel between the plasma spark generation electrodes that provides an at-will, non-critical timing sequence and/or a sustainable spark gap channel as a precursor to electrically transmitting a high voltage current surge to the live electrode to generate an MPS discharge event. The chemical reaction generated spark gap channel can generate a thermal gradient in the proximity of the plasma generator; can assist in clearing the electrode spark gap from product gasses and/or debris; can extend the duration of the expanding plasma bubble and/or protract the bubble collapse timing to prolong the hydrodynamic surge wave effects.

In another aspect of the embodiments of the present invention, a metal filament deployment and adjustment means is provided to generate an explosive wire generated MPS discharge.

In another aspect of the embodiments of the presentation invention, a wellhead positioned means to hold and change the position of the various conduits, equipment and interconnects necessary to place, operate, maintain, gather data, provide command and control and retrieve and/or reposition the PPE tool system.

In another aspect of the embodiments of the present invention, the PPE tool may provide a directional reflector or concentrator, such as shape parabolic concentrator means, to directionally confine and/or focus the MPS discharge generated surge waves.

In another aspect of the embodiments of the present invention, a means is provided to generate a radial stress cage surrounding a single well bore that has an interior area of rubblized formation material that may be further reduced in individual formation piece size through the repeated application of various levels of high energy MPS discharge generated surge waves.

In another aspect of the embodiments of the present invention, a means to pump a pressured fluid into and from one wellbore through an induced permeable pathway to an adjacent wellbore to entrain and/or produce formation matrix pore fluids into one or more adjacent wellbores so as not to have to rely solely on the then existing natural in situ formation drive type and pressure levels as the primary means to produce the pore space fluids towards a permeability centric well bore as is the dominant practice of the prior art.

In another aspect of the embodiments of the present invention, a means is generated between two or more wellbores such that a pressurized fluid can be pumped between the two or more well bores to hydraulically produce the formation fluids to the surface for processing, one well acting in an injection wellbore mode and one well acting in a production wellbore mode.

In another aspect of the embodiments of the present invention, a means is provided to pump or flow the produced fluids to a surface based processing system whereby marketable fluids and materials, reusable fluids and materials and disposable fluids and materials are separated to be marketed, reused and/or disposed of. The surface processing system may be comprised of separators, heater-treaters, storage containers, bulk material, fluid and/or material processing plants, pumps and command and control instrumentation with associated computer processing and control programs such as are commonly used in conjunction with production methods and equipment for hydrocarbons, heat energy and/or minerals.

In another aspect of the embodiments of the present invention, a permeable pathway is generated between two or more wellbores such that a pressurized fluid can be pumped sequentially, in a bidirectional manner between the two or more wellbores to mitigate and/or cure any permeable pathway blockages resulting from solid particle buildup within the permeable pathways caused by fracturing, dilatation, spallation, hydro-shearing and/or other production processes.

In another aspect of the embodiments of the present invention, a permeable pathway is generated between two or more well bores such that a pressurized fluid can be pumped sequentially, in a bidirectional manner, between the two or more well bores and adding chemicals, materials and/or fluids to the pressurized fluid to generate specific permeable pathway blockages to temporarily or permanently restrict or block all or specific permeable pathways.

In another aspect of the embodiments of the present invention, a permeable pathway is generated between two or more wellbores such that a pressurized heated fluid can be pumped sequentially, in a bidirectional manner, between the two or more wellbores in a manner that reduces the heat requirements used in Steam Assisted Gravity Drainage, Huff and Puff, Hot Solvent Flooding and/or Combustion Flooding methods for of heavy oil and bitumen production methods. The heavy oil is acted upon by the MPS impulse forces to effectively reduce the oil viscosity and to provide surge pressure to energize and force the oil to mobilize towards the production well.

In another aspect of the embodiments of the present invention, a permeable pathway is generated between two or more wellbores such that a pressurized heated fluid and/or additives that can be pumped sequentially, in a bidirectional manner, between the two or more well bores such that the heavy oil is acted upon by MPS impulse forces to effectively upgrade the heavy oil in situ and produce the product.

In another aspect of the embodiments of the present invention, the plasma generation process can be modulated to provide variations of the surge wave forms and properties used in conjunction with impedance matching to the formation and/or the fluids flowing through formation matrix to provide an efficient energy coupling and fluid production effects.

In another aspect of the embodiments of the present invention, the plasma generation process can be modulated to provide variations of the surge wave forms and properties used to break down and/or fracture the formation to a certain grade or size of the predominate particle or aggregate forms to render them easier to fluidize, leach, solution mine and/or physically mine.

In another aspect of the embodiments of the present invention, the plasma generation process can be modulated to provide variations of the surge wave forms and properties used to break down and/or fracture the formation to separate different formation materials and/or constituents such as crystalline formation from more plastic material and/or constituents.

In another aspect of the embodiments of the present invention, the plasma generation process can be modulated to provide variations of the surge wave forms and properties used to fracture, hydro-shear, dilatate, spall and/or break-down the formation to a certain predominant grade or size to increase the effective mining of geothermal heat.

In another aspect of embodiments of the present invention, a means is provided to inject additives into the formation matrix in conjunction with the pressurized sweeping fluid to be acted upon by the MPS generated surge waves such that the additives may be used to provide enhanced fracturing, hydro-shearing, dilatation, spallation and/or enhanced pore space fluid, mineral or heat production.

In another aspect of the embodiments of the present invention, provides the placement of temperature, chemical and/or mechanical activated medium within the formation matrix and used in conjunction with the MPS generated surge waves to assist in the generation of formation matrix fracturing, hydro-shearing, dilatation, spallation and/or flow through the formation matrix.

In another aspect of the embodiments of the present invention, the placement of temperature, chemical and/or mechanical activated medium within the formation matrix is provided and used in conjunction with the MPS generated surge waves to assist in the in situ upgrading of the fluid, material and/or heat resources.

In another aspect of the embodiments of the present invention, the operation of the present invention provides for the placement of fluids that are specifically intended to chemically and/or thermally interact with the formation material and/or fluids (e.g.—fluids such a steam, solvent, acids, etc.). Such fluids are not primarily used as formation production sweeping fluids but rather provide their primary function interacting chemically and/or thermally with the formation and/or formation fluids.

In another aspect of the embodiments of the present invention, a means is provided to produce Methane Clathrates. The Methane Clathrates reservoir may be developed by the use of the present invention providing a means to energize the Methane Clathrates bearing formation through in situ pressure and/or temperature modifications to a point of liberating the methane for production.

In another aspect of the embodiments of the present invention, a means is provided to produce diamonds from within Kimberlite and such like funnel shaped formations that contain diamonds deep within the earth. The diamond reservoir could be developed by the present invention providing a means to establish inter-well fracturing, circulation and pumping or aerated based artificial lifting processes. A precious gem reservoir may be exploited by generating fracturing, resource material fluidization and various means of lifting the fluidized material such as fluid differential pressure to produce the fractured reservoir material and gems to the surface for processing.

In another aspect of the embodiments of the present invention, a means is provided to convert in situ Kerogen into hydrocarbon products that can be produced by means of the systems and methods of the present invention.

In another aspect of the embodiments of the present invention, various combinations of sequenced, alternating, bidirectional, electromagnetic wave, acoustic wave, hydraulic wave, and sweeping fluid generation and operational methods to generate various resource bearing formation effects such as fracture initiation, fracture extension, fracture interconnection, fracture interconnection changes, permeability redirection, dilatation, hydro-shearing, spallation, various degrees of in situ fluid, mineral or heat property changes, upgrades, stimulation and the permanent and/or temporary blocking and unblocking of permeable pathways and other such like actions.

These and other objects, features, and characteristics of the present invention, as well as the methods of operation and functions of the related elements of structure and the combination of parts and means of manufacture, deployment, installation, operation, adjustment, removal and maintenance will become more apparent upon consideration of the following description and the appended claims. With reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention.

DETAILED DESCRIPTION OF THE PREFERRED EMBODIMENTS

The following description concerns a number of embodiments and is meant to provide an understanding of the embodiments. The description is not in any way meant to limit the scope of any present or subsequent related claims. Unless otherwise specified or indicated by context, the terms "a", "an", and "the" mean "one or more." The terms "about", "approximately, substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus 5-10% of the particular term and "substantially" and "significantly" will mean plus or minus >10% of the particular term. The terms "include" and "including" have the same meaning as the terms "comprise" and "comprising." The terms "above" and "below"; "up" and "down"; "upper" and "lower"; "upwardly" and "downwardly"; and other like terms indicating relative positions above or below a given point or element are used in this description to more clearly describe some embodiments. However, when applied to equipment, systems, and methods for use in one or more wells that are vertical, deviated or horizontal, such terms may refer to a left to right, right to left or diagonal relationship as appropriate. The term "metal" typically refers to a solid material that is hard, shiny, malleable, fusible, and ductile with good electrical and thermal conductivity. As used herein, metal may refer to a pure metallic element or an alloy comprising two or more non-metallic elements.

Figure 1:
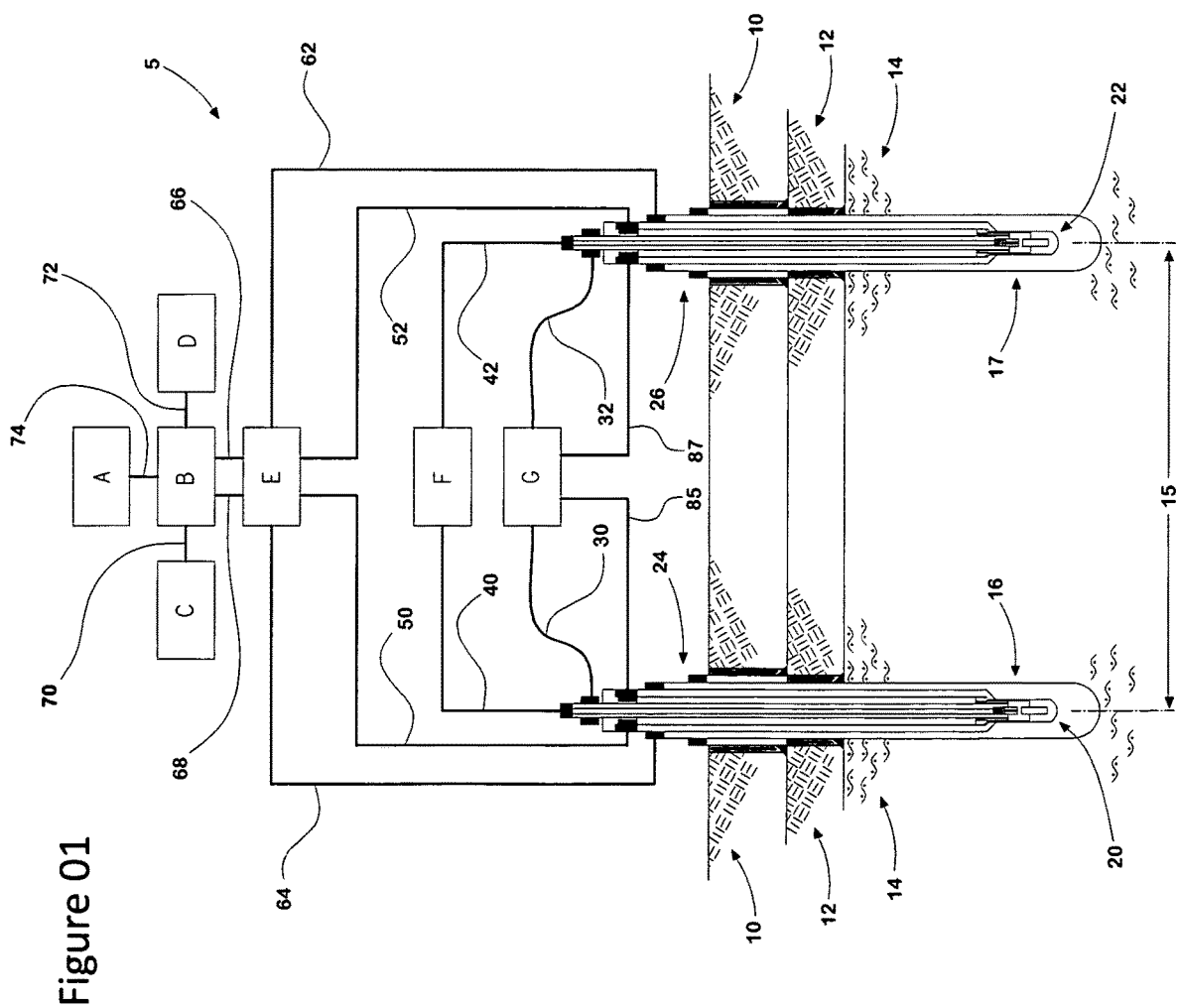
FIG. 1 illustrates a schematic example of an overall high energy pulsed plasma emitter production system in accordance with an embodiment of the present invention.

FIG. 01 illustrates an embodiment of the over-all formation resource production system 5. Production system 5 generates repetitive inter-wellbore, high energy, multi-form, impulse waves. Over time the impulse waves generate an inter-well, ever-changing, interconnected micro, mini, and macro formation matrix fracture systems and formation fluid mobilization energization in conjunction with a coincidental directional pressure flooding of the formation. Typically, one of more adjacent wellbores 16 and 17 are spaced at a specific distance 15 based on various operational, geological and legal variables. Wellbores 16 and 17 are drilled through formations 10 and 12 to penetrate into and generally terminate in a hydrocarbon bearing formation 14. Wellhead attachment systems 24 and 26 suspend the pulse plasma emitter (PPE) tools 20 and 22 respectively. Wellhead attachments 24 and 26 are interconnected to a pulsed power electrical surge energy source G through electrical power transmission lines 30 and 32 respectively; and electrical power transmission return lines 85 and 87 respectively. Wellhead attachments 24 and 26 are interconnected connected to pump system material supply and pump system F through flow lines 40 and 42 respectively. Wellhead attachments 24 and 26 are interconnected to pumping system E through flow lines 50, 52, 62 and 64. Production fluid processing system B is flowingly interconnected to marketable fluid storage system A, disposable fluid and material storage system D and reusable fluid and material storage system C connected to pumping system E through flow lines 66, 68, 70, 72 and 74 respectively.

Figure 2:
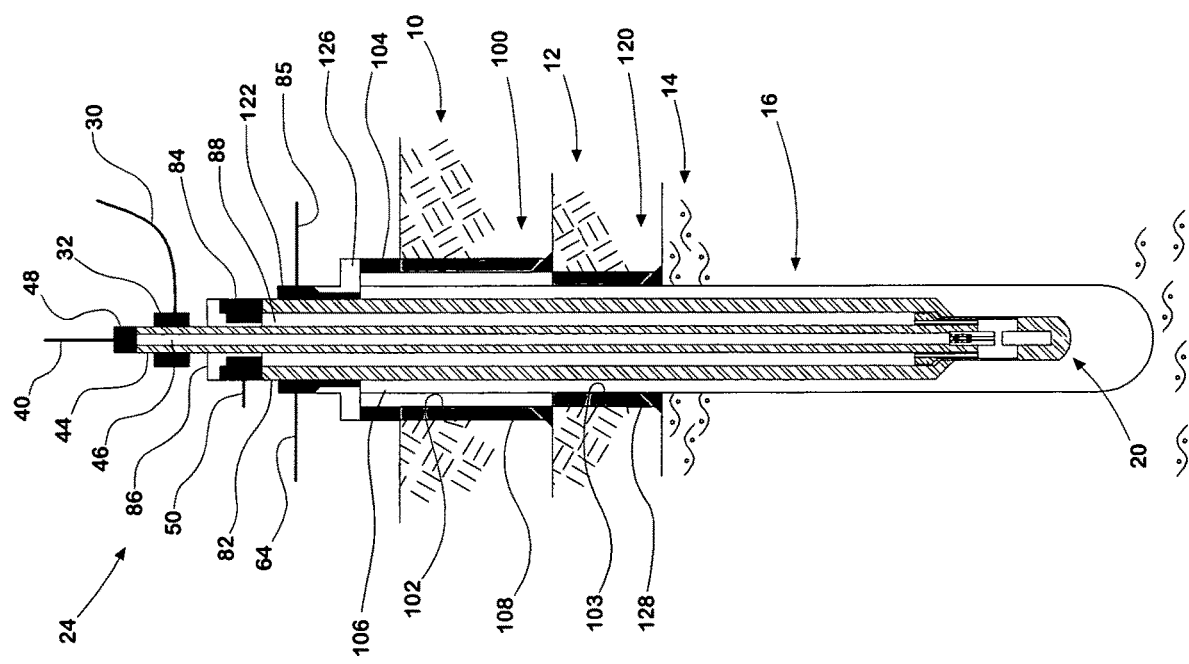
FIG. 2 is an illustrates a schematic example of a single well bore subsystem in accordance with an embodiment of the present invention.

FIG. 02 illustrates a single wellbore subsystem in accordance with the preferred embodiment of the present invention. Wellbore 16 is drilled through subsurface formations 10 and 12 terminating within formation 14. Wellbore 16 is isolated from formation 10 by surface casing system 100 comprised of steel casing 102 and cement sheath 108 and from formation 12 by intermediate casing system 120 comprised of steel casing liner 103 and a cement sheath 128. Casing wellhead 104 is mechanically attached to surface casing 102 and in combination forms annular space 106.

Wellhead attachments 24 aggregately consists of wellhead tubing spool 126 which is attached to casing wellhead 104. Casing slip and seal assembly 122 is situated within wellhead tubing spool 126 and serves the purpose of suspending casing tubular 82 within the wellbore 16 and is flowingly connected to pumping system E through flow line 64. Tubing head 84 is mechanically attached to casing tubular 82. Casing slip and seal assembly 86 is situated within tubing head 84 and serves the purpose of suspending PPE tool system 20 and the surge power transmission and PPE positioning tubular 44 which forms annulus space 88. Tubing head 84 is flowingly connected to pumping system E through flow line 50. Tubular cap 48 is mechanically attached to surge power transmission and PPE positioning tubular 44 and is flowingly connected to pump system F through flow lines 40 to provide the means to pump fluids into surge power transmission and PPE positioning tubular 44 internal conduit space 46. Electrical connector 32 is mechanically attached to surge power transmission and PPE positioning tubular 44 and is electrically connected to pulsed power source G through transmission line 30. Gounding conductor 85 is attached to casing slip and seal assembly 122 and pulsed power source G.

Figure 3:
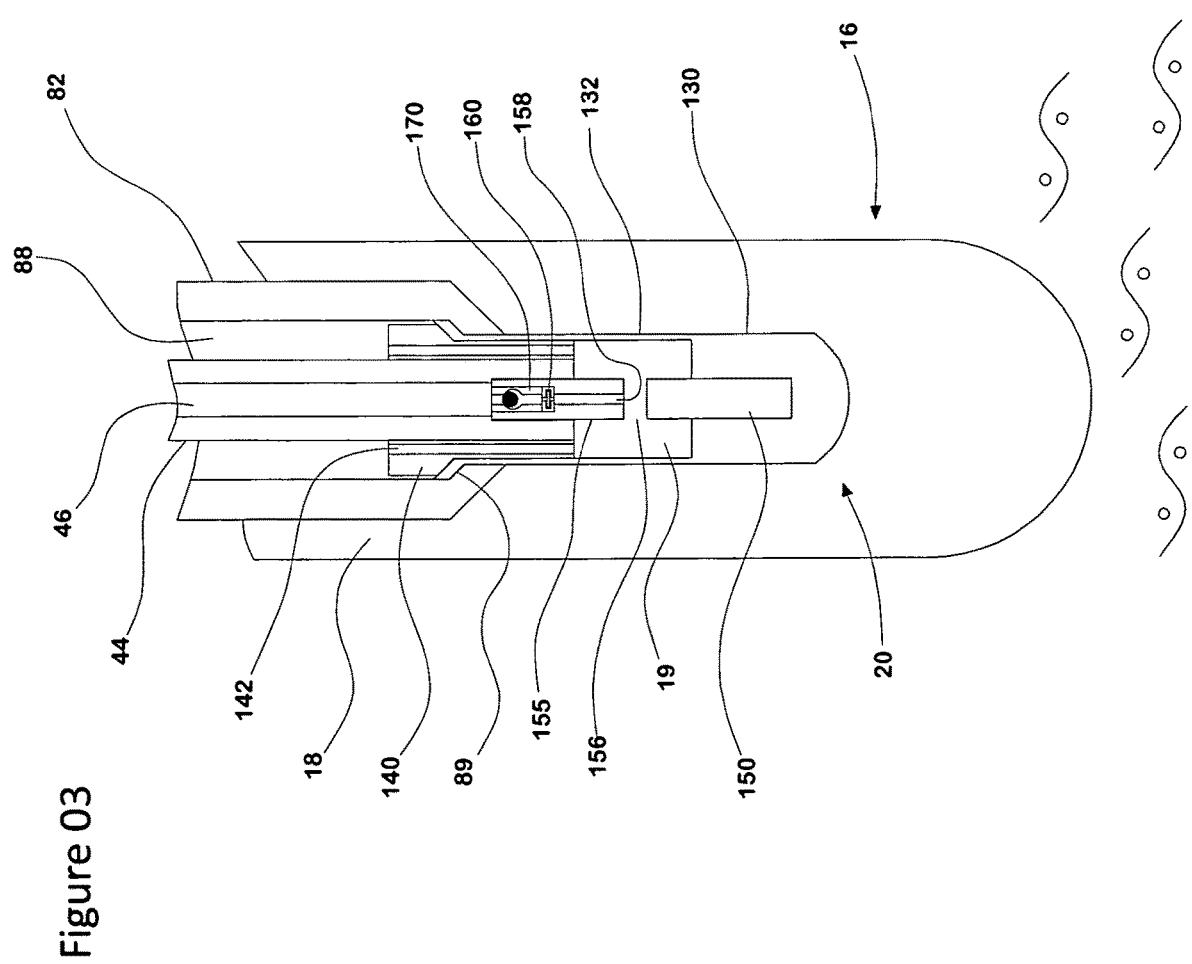
FIG. 3 illustrates a schematic example of plasma emitter subsystem in accordance with an embodiment of the present invention.

FIG. 03 illustrates an embodiment of the PPE tool 20. The distal end of casing tubular 82 suspended in wellbore 16 by slip and seal assembly 122 (not shown) within wellhead tubing spool 126 (not shown) is crimped to provide internal seating shoulder 89. PPE tool is deployed through casing tubular 82 by surge power transmission and PPE positioning tubular 44 and seats on internal seating shoulder 89 to position the PPE tool 20 into the annular area 18 of wellbore 16.

PPE tool 20 is comprised of outer housing 130 which houses lower electrode 150 and seats into casing tubular 82 internal seating shoulder 89 thereby forming an electrically conductive contact between casing tubular 82, outer housing 130 and lower electrode 150. Outer housing 130 has various configurations of cutout spaces 132 or may have reflectors or concentrators that form the fluid space 19 in and around the electrodes 150 and 155 as is commonly known in the downhole plasma emitter systems prior art. Dielectric insulator 140 is mechanically attached to both outer housing 130 and surge power transmission and PPE positioning tubular 44. Dielectric insulator 140 provides one or more radially configured flow paths 142 as a means of flowingly connecting annular space 88 to annular space 18 and 19 of wellbore 16. The distal end of surge power transmission and PPE positioning tubular 44 is mechanically attached to upper electrode assembly 155. Spark gap area 156 is formed between the electrodes 150 and 155. Upper electrode assembly 155 retains check valve means 170 and catalyst means 160. Interior conduit space 46 of surge power transmission and PPE positioning tubular 44 is flowingly connected to spark gap area 156 through check valve means 170, catalyst means 160 and discharge nozzle 158 of upper electrode assembly 155.

Figure 4:
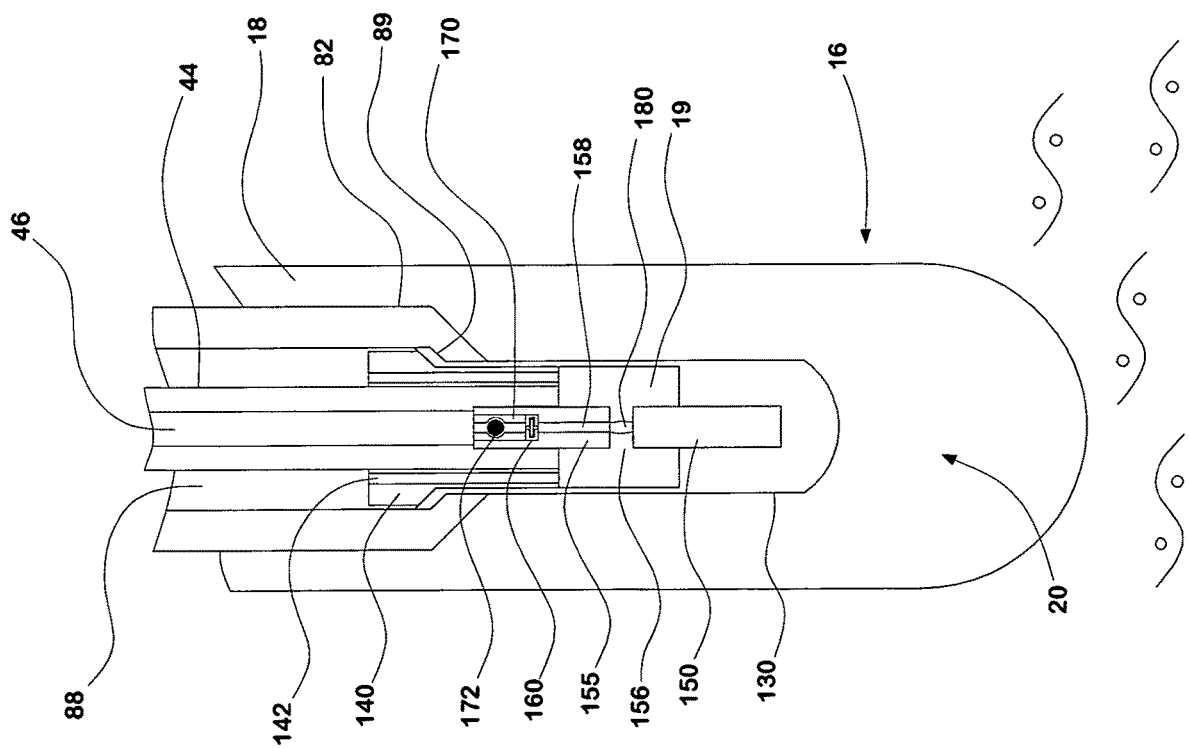
FIG. 4 illustrates a schematic example of plasma emitter subsystem and identifying a plasma spark channel in accordance with an embodiment of the present invention.

FIG. 04 illustrates an embodiment of the PPE tool 20 as shown in FIG. 03, generating at least a partially ionized fluid spark channel 180 between the upper electrode 155 and the lower electrode 150 by means of pumping chemicals through the interior conduit space 46 of surge power transmission and PPE positioning tubular 44, through check valve means 170, through catalyst means 160, through discharge nozzle 158, and into spark gap area 156. The electrodes 150 and 155 may include a high temperature resistant materials—e.g. a ceramic or ceramic composites, metal-ceramic composites, stainless steels, austenitic steels and super alloys such as Hastelloy, Inconel, Waspaloy, Rene alloys (i.e.—Rene 41, Rene 80, Rene 95), Haynes alloys, Incoloy, MP98T, TMS alloys, and CMSX single crystal alloys, metal carbides, metal nitrides, alumina, silicon nitride, and the like. These materials may also be coated to improve their performance, oxidative and chemical stabilities, and/or wear resistance. The chemical reaction means of generating at least a partially ionized spark gap channel 180 is utilized to significantly reduce the wear on the electrode 150 and 155 end surfaces when compared to high voltage breakdown of a dielectric fluid within the electrode gap area 156 and/or exploding a metal filament type material across the electrode gap area 156. Further, the use of a chemical reaction to generate at least a partially ionized spark gap channel 180 will eliminate the need for a mechanically deployed system to operate in a harsh downhole environment while periodically deploying and/or positioning a filament type material to serve as an exploding filament plasma initiation means.

Figure 5:
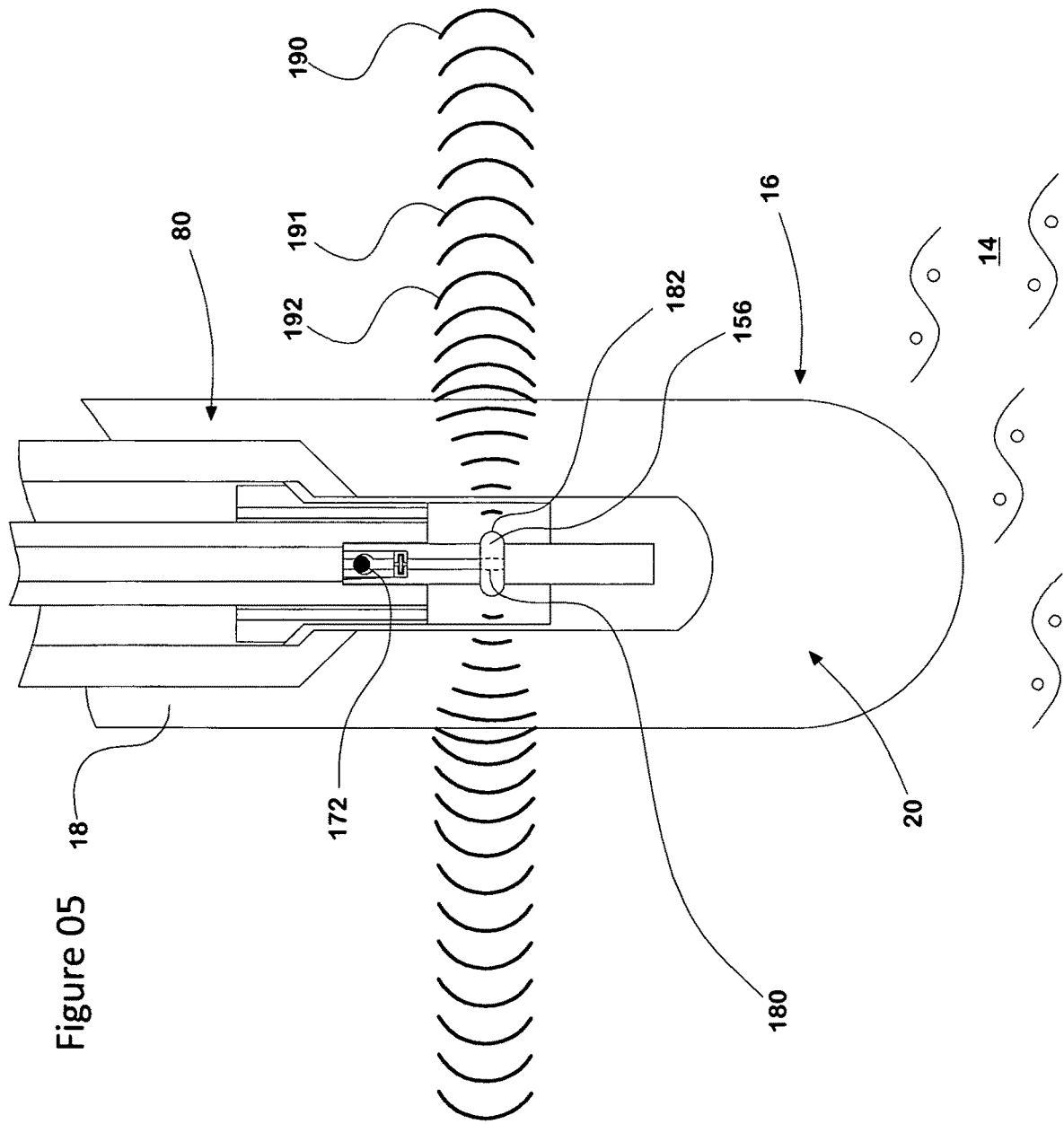
FIG. 5 illustrates a schematic example of plasma emitter subsystem and identifying a plasma bubble in accordance with an embodiment of the present invention.

FIG. 05 illustrates an embodiment of the plasma generation tool 20, as shown in FIGS. 03 and 04, illustrating the growth of a spark channel 180 evolving into a highly energetic explosively expanding MPS bubble 182 by pumping a high power electric surge current through surge power transmission and PPE positioning tubular 44 and into spark gap area 156 through the spark channel 180. The resulting high power MPS concomitantly generates electromagnetic and acoustic impulse waves while the explosively expanding plasma bubble 182 generates a hydrodynamic impulse wave, shown as impulse wave 190, 191, and 192, respectively. The highest velocity electromagnetic wave 190, and the next highest velocity acoustic impulse wave 191, and lowest velocity hydrodynamic impulse wave 191 are collectively coupled by the annular fluid 18 that serves as an efficient medium that transfers the impulse waves into the adjacent walls of wellbore 16 and therefore into the formation 14.

Figure 6:
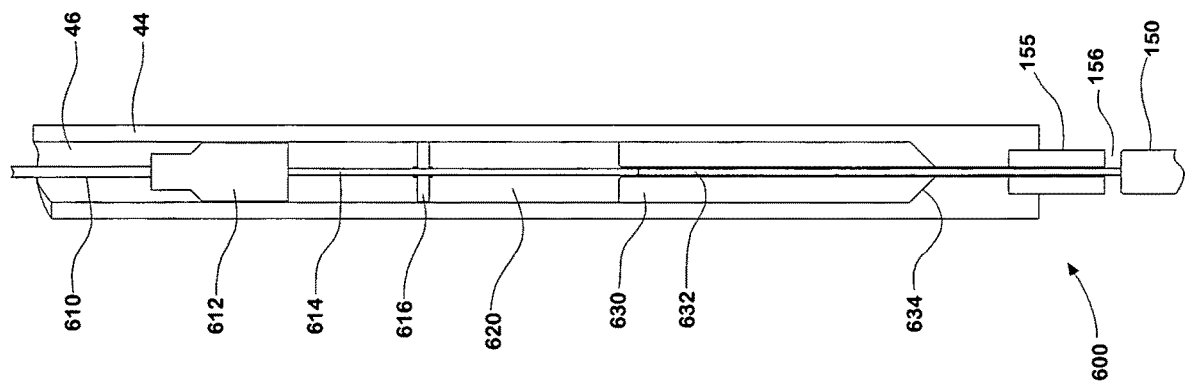
FIG. 6 illustrates a schematic example of a metal filament deployment system in accordance with an embodiment of the present invention.

FIG. 06 illustrates an embodiment of a spark gap metal filament deployment system 600. Dielectric filament carrier 630 containing metal filament rod 632 is wire line deployed through interior conduit space 46 of surge power transmission and PPE positioning tubular 44 by electrical conductor and deployment wire line 610 attached to latch head 612, attached to push rod 614. Push rod 614 is laterally stabilized by short rib stabilizers 616, and is attached to dielectric filament carrier 630. Filament carrier 630 contains metal filament 632, and seats in conically converging seat 634. Upon seating, dielectric filament carrier 630, metal filament 632 is axially repositioned by forcing push rod system 614 through a receptacle hole in the distal end of surge power transmission and PPE positioning tubular 44, through upper electrode 155 and forced to contact lower electrode 150 thus providing the metal filament rod 632 into electrode spark gap area 156 to initiate a MPS discharge.

Figure 7:
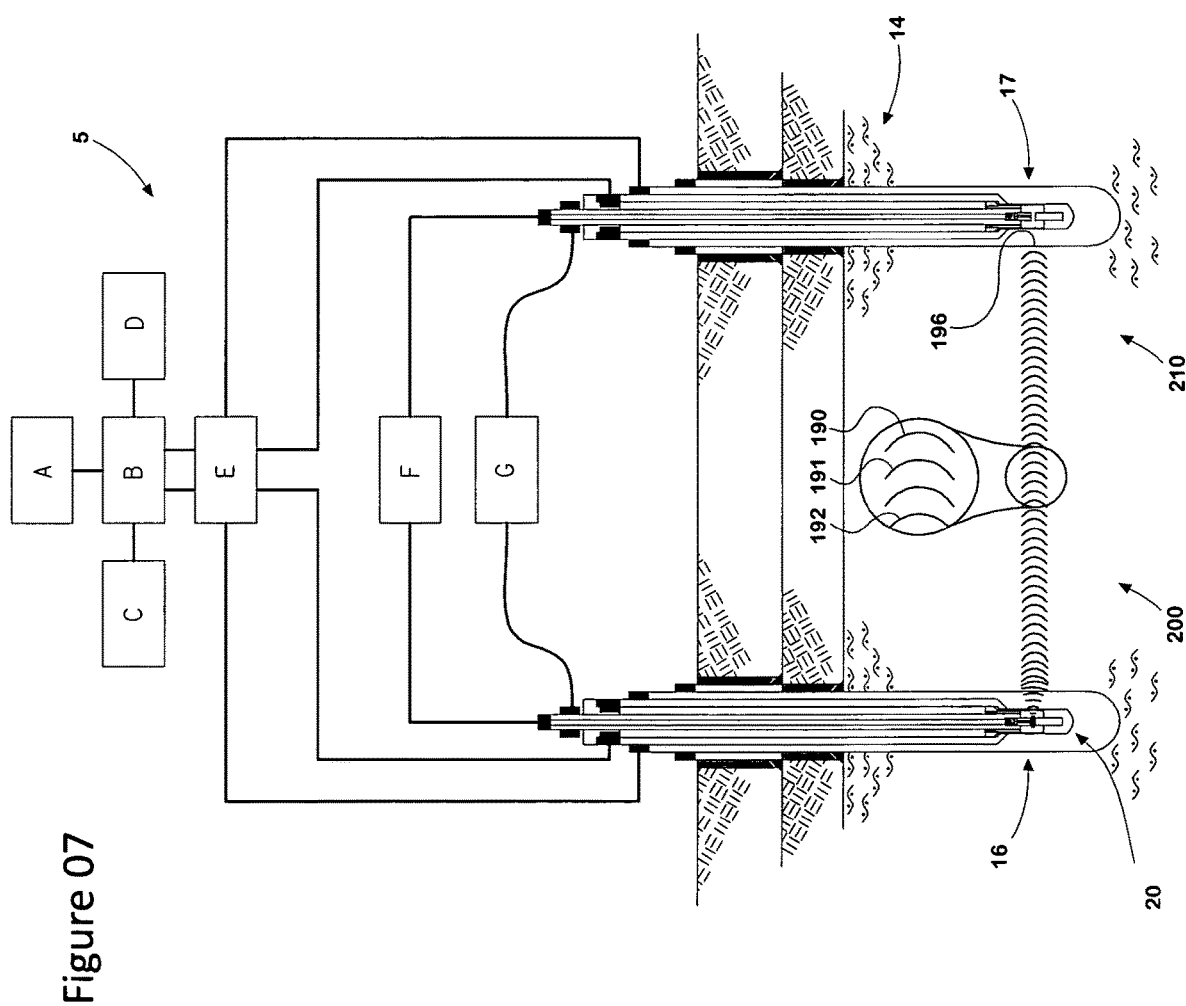
FIG. 7 illustrates a schematic example of an explosive MPS discharge bubble generated impulse surge waves emanating from an injection mode wellbore in accordance with an embodiment of the present invention.

FIG. 07 illustrates an embodiment of the over-all production system 5, as show in FIG. 01, whereby impulse waves 190, 191 and 192, are generated and directionally focused by the PPE tool 20, within wellbore 16 and travels through formation 14 towards wellbore 17. The impulse waves 190, 191 and 192 travel through formation 14 between well bores 16 and 17 firstly in a compression stress mode in the approximate region 200 and then transition into a tension stress mode in the approximate region 210 prior to arriving at wellbore 17.

Figure 8:
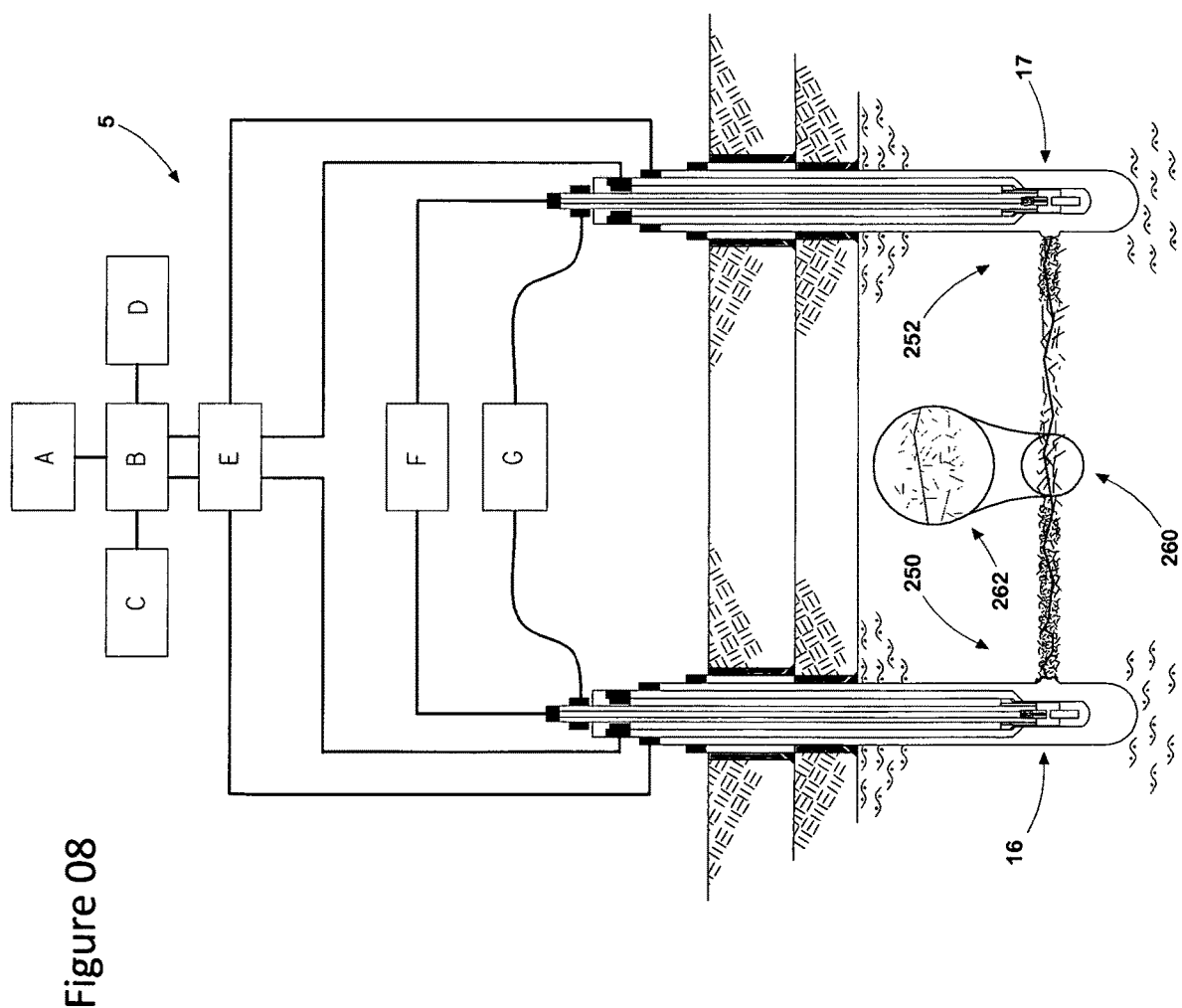
FIG. 8 illustrates a schematic example of inter-wellbore macro fracture permeable pathway breakthrough in accordance with an embodiment of the present invention.

FIG. 08 illustrates an embodiment of the over-all production system 5, as show in FIG. 01, further illustrating the initial micro, mini and macro permeable formation fracture system 260 which collectively establishes a permeable pathway breakthrough between well bores 16 and 17. Regions 250 and 252 represent near well bore stress cage interior spaces having higher fracture density due to tension stress mode failure progressively generated in close proximity to well bore 16 and 17.

Figure 9:
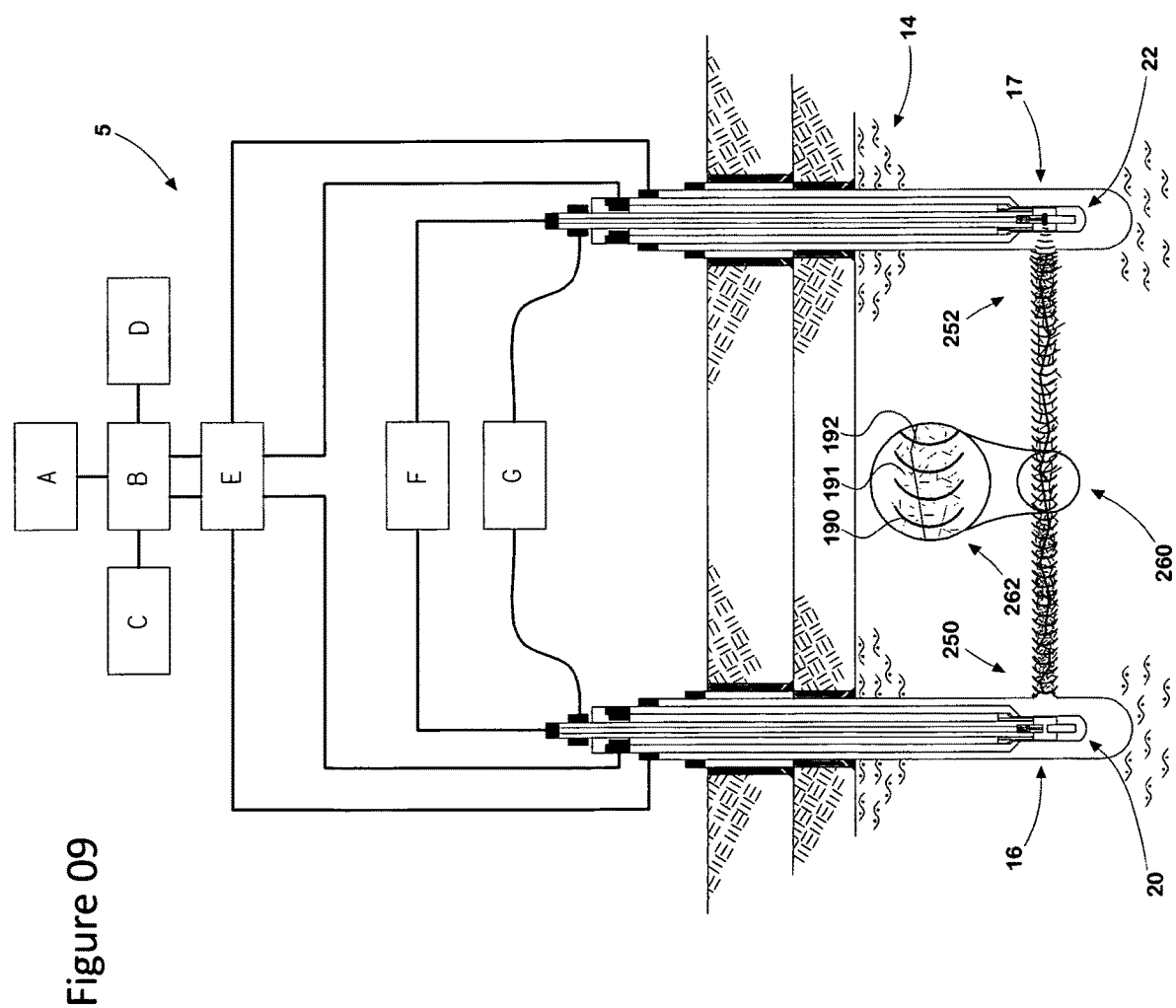
FIG. 9 illustrates a schematic example of MPS discharge bubble generated impulse surge waves emanating from a production mode wellbore in accordance with an embodiment of the present invention.

FIG. 09 illustrates an embodiment of the over-all production system 5, as show in FIG. 01, illustrating the progressive generation of additional micro, mini and macro permeable formation fractures being generated as shown in region 260 by means of typical impulse waves 190, 191 and 192, generated and directionally focused by the PPE tool 22, within wellbore 17 and traveling through formation 14 towards wellbore 17. The fracture system 260 progressively increases in effective permeability due to increased fracture density generated as a result of repetitive bidirectional MPS discharges. Regions 250 and 252 represent near well bore stress cage interior spaces exhibiting higher fracture density due to progressive tension stress mode formation failure generated by repetitive bidirectional MPS discharges.

Figure 10:
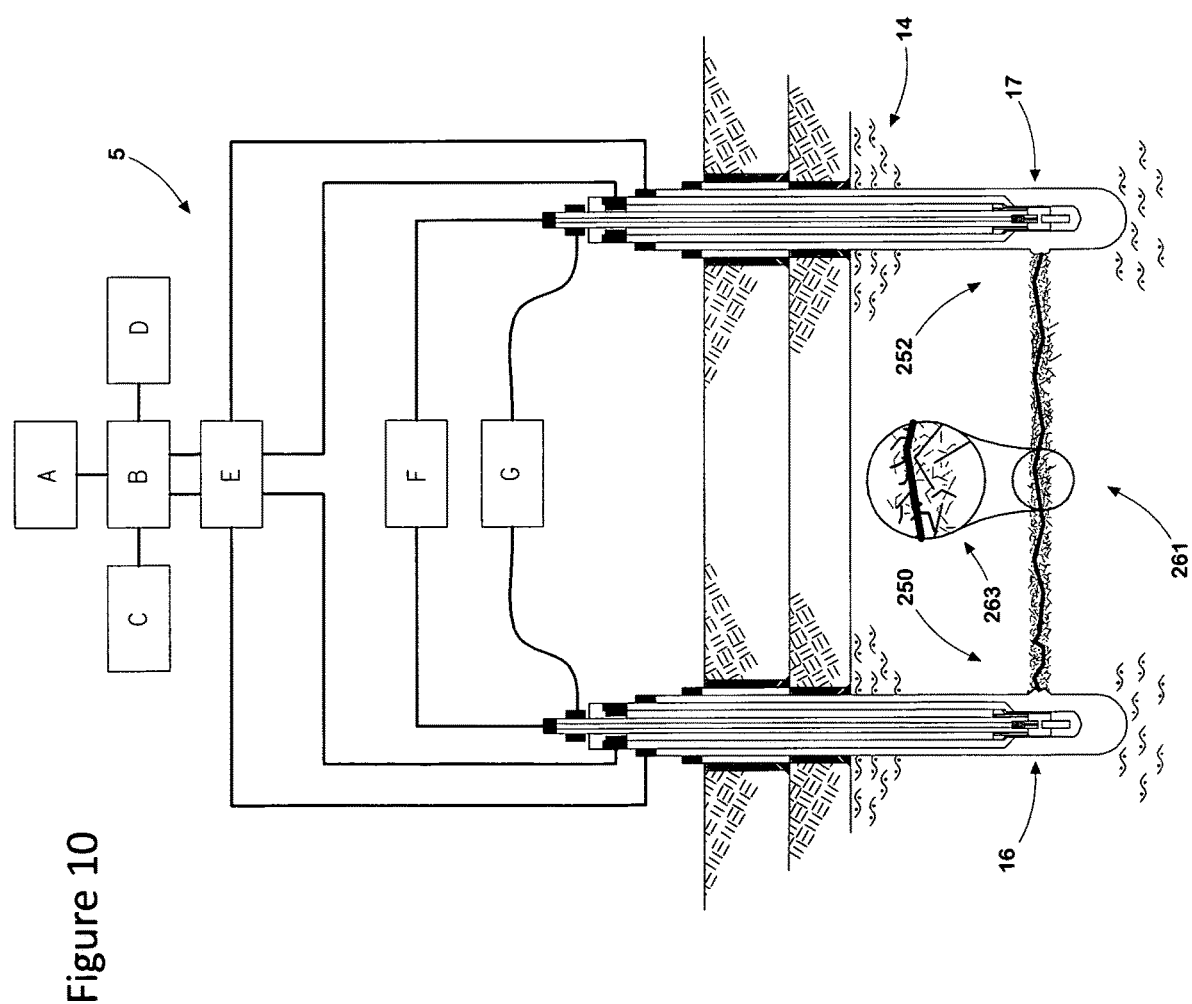
FIG. 10 illustrates a schematic example of the modified formation matrix permeable macro fracture pathways in accordance with an embodiment of the present invention.

FIG. 10 illustrates an embodiment of the over-all production system 5, as show in FIG. 01, further illustrating the increase of high density permeable formation micro, mini, and macro fractures 261 that have been established between well bores 16 and 17. Regions 250 and 252 represent a higher fracture density region of the interior of each well bore radial stress cages proximal to well bores 16 and 17 respectively.

Figure 11:
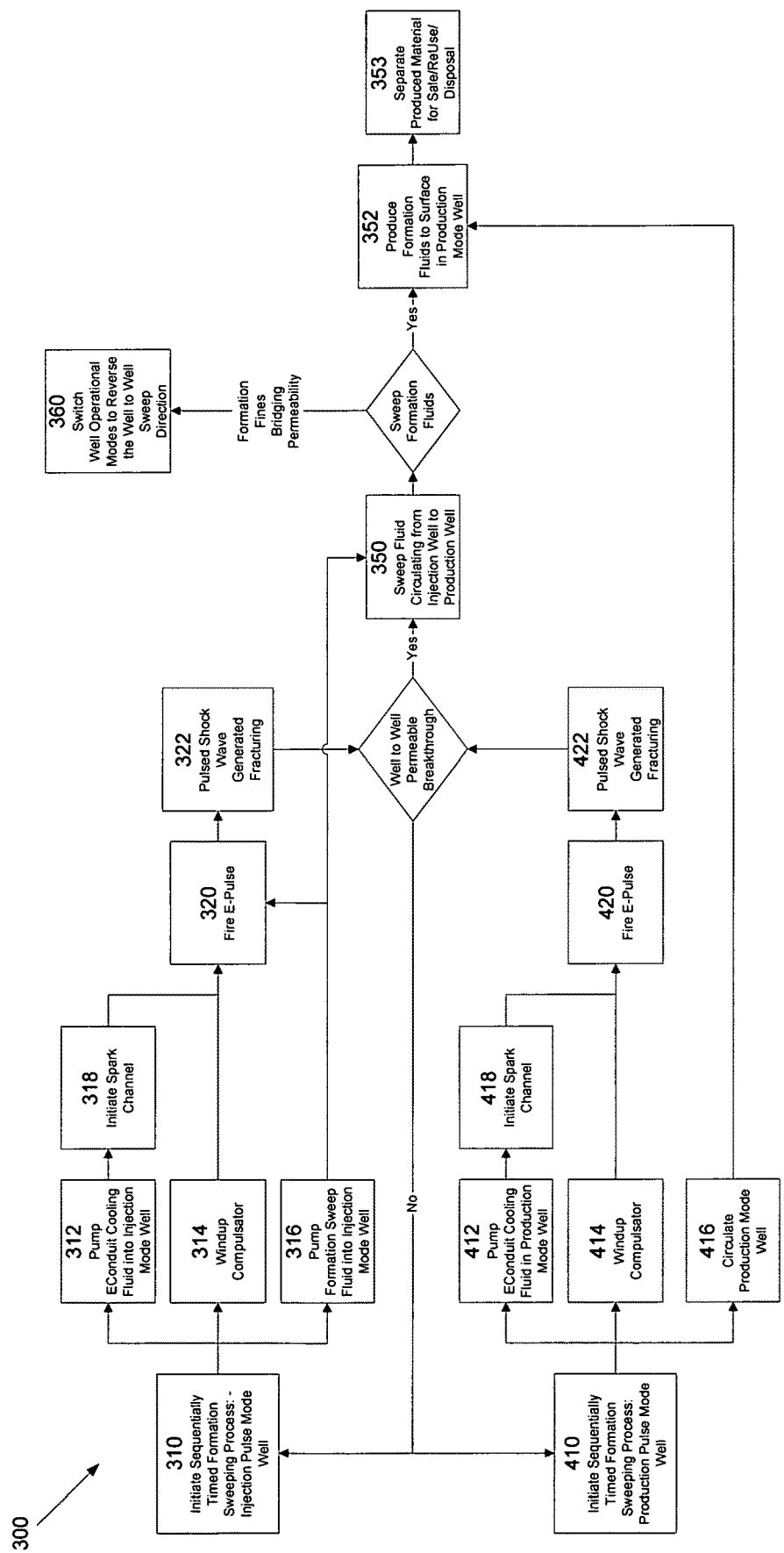
FIG. 11 shows an illustrative operational flow chart in accordance with an embodiment of the present invention.

FIG. 11 illustrates a flow chart of steps for one method of operating one embodiment of the present invention that provides the coordinated sequential operation of two pulsed plasma generation tools to generate an inter-well set of high density permeable fractures from which to access, produce and process the formation fluids.

An exemplary description of the method of operation of a preferred embodiment of the production system 5 in producing hydrocarbon liquids, and more specifically oil, is now provided. Wellbores 16 and 17 respectively are drilled through surface formation 10, intermediate formation 12, and are terminated in oil productive formation 14 as illustrated in FIG. 01.

A typical wellbore casing isolation system for each well bore 16 and 17 is exemplified by the casing and wellbore configuration illustrated in FIG. 02. Wellhead 104 mechanically attached to surface casing 102 is contained in and thereby isolates surface formation 10 by means of a cement sheath 108. Intermediate casing liner 103 is contained in and thereby isolates the intermediate formation 12 by a cement sheath 128. Borehole 16 is drilled into oil productive formation 14. The wellbore 16 is thereby defined by the interior space of wellhead 104, the interior space of intermediate casing liner 103 and the open borehole 16 within productive formation 14. Thus the well bore system of the present invention is readied for production operations as is typical of conventional vertical well drilling and open-hole completion operations.

In preparation for productive formation 14 stimulation and production operations of the present invention, FIG. 01 illustrates PPE tools 20 and 22 suspended in wellbores 16 and 17, respectively, through wellhead attachments 24 and 26, respectively. Each PPE tool 20 and 22 are electrically connected to pulsed power source G through electrical transmission lines 30 and 32, respectively. Each PPE tool 20 and 22 is flowingly connected to pump F through flow lines 40 and 42, respectively. Each PPE tool 20 and 22 is flowingly connected to pumping system E through flow lines 50 and 52, respectively.

Now referring to FIG. 02, a typical preferred embodiment of the wellbore and wellhead configuration for each well of the production system 5 is illustrated. The wellbore annulus 106, of FIG. 02, is flowingly connected through wellhead attachments 126 and 122 to pumping system E through flow lines 64 and 62 respectively.

An embodiment of the production system 5 is comprised of a PPE tool 20 mechanically suspended by surge power transmission and PPE positioning tubular 44 which assembly is seated onto a receptacle seat positioned at the lower end of the casing tubular 82 and suspended by the well head attachments 84 and 86. Outer casing 82 is suspended within wellbore 16 by the wellhead attachments 126 and 122.

Surge power transmission and PPE positioning tubular 44 is connected to PPE tool 20 by a threaded connection and suspended in wellbore 16 by wellhead attachments 84 and slip, seal and electrical isolation means 86. Thus suspended in wellbore 16, surge power transmission and PPE positioning tubular 44 is electrically connected to pulsed power source G through electrical transmission line 30 and mechanical clamp 32 on its upper end and the PPE tools 20 on the other downhole end. Surge power transmission and PPE positioning tubular 44 interior conduit space 46 is flowingly connected to pump system F through flow line 40 and interconnection cap 48. Surge power transmission and PPE positioning tubular 44 is coated with an insulation (not shown) from below the mechanical clamp 32 down to the threaded attachment of PPE tool 20 in order to provide an electrically insulated exterior for surge power transmission and PPE positioning tubular 44. Alternately, annular space 88 is filled with a dielectric insulation fluid thereby providing electrical insulation between surge power transmission and PPE positioning tubular 44 and outer casing 82. Outer casing 82 is suspended within wellbore 16 by wellhead spool 126 and slip, seal assembly 84 and creating annular space 122. Wellbore 16 annular area 106 is flowingly connected to pump system E through flow line 64.

Now referring to FIG. 03, PPE tool 20 is suspended within wellbore 16. Casing tubular 82 is suspended at a point above the bottom of wellbore 16 thus providing a strategic measured depth subsurface placement of the PPE tool 20 within and across from the productive formation 14 of wellbore 16. Surge power transmission and PPE positioning tubular 44 is positioned coaxially within casing tubular 82. Surge power transmission and PPE postioning tubular 44 may be delivered to the well site with a pre-existing layer of insulating material and fluted standoff bands bonded on its exterior (not shown). Standoff bands will be placed between the surge power transmission and PPE positioning tubular 44 and the casing tubular 82 to maintain the coaxial position between the two tubulars thus ensuring there is no lateral contact between the two tubulars. Surge power transmission and PPE positioning tubular 44 is connected to the PPE dielectric insulator 140 and upper electrode 155. The PPE dielectric insulator 140 is mechanically attached to PPE outer housing 130 and thereby forms the distal end of the PPE tool 20. Outer housing 130 retains lower electrode 150 in a position that is specifically spaced to provide an appropriate electrode gap 156 for the desired operational specifications. Outer housing 130 seats within casing tubular 82 at mechanical seating point 89. The PPE tool 20 thus provides a spark gap open circuit initiating from the CAPP pulsed power source G through electrical transmission line 30 through surge power transmission and PPE positioning tubular 44 through upper electrode 155, open spaced spark gap 156, lower electrode 150, outer housing 130, casing tubular 82 and electrical transmission line 85 attached to CAPP system G. Dielectric insulator 140 provides electrical insulation between surge power transmission and PPE positioning tubular 44 and outer housing 130 and casing tubular 82. Dielectric insulator 140 has radial through-ports 142 (typical) flowingly connected to annular space 88 and annular area 19. Upper electrode 155 retains a one-way check valve 170 and a catalyst pack 160 flowingly connected from inner conduit space 46 to ambient fluid area 19 through cylindrical discharge nozzle 158 of upper electrode 155.

In operation, the production system 5 of FIG. 01 through FIG. 10 operates according on method illustrated by the flow chart 300 step provided in FIG. 11. For purposes of explanation, wellbore 16 will initially be designated to operate as an injection mode wellbore and wellbore 17 will initially be designated to operate as a production mode wellbore mode. One typical high energy PPE system 24 is placed within each wellbore 16 and 17, respectively. Wellbore 16 is initially used as an injection mode wellbore whereby it provides an injection of inter-wellbore fluid flow, when possible, towards adjacent wellbore(s), in this case, production mode wellbore 17. Typically an injection mode well and several production mode wells will be serviced by a single installation of the surface equipment as is schematically illustrated FIG. 01. Therefore in the description of the operation of the present invention, several steps that are numbered as separate steps in flow chart 300 will actually be provided by the action of the single system. The description of the present invention's operation will be described in terms of the injection mode well, wellbore 16, but the description similarly describes the typical production well, wellbore 17, operations. Only the functions or results that differentiate the type of well mode will be described in additional detail.

Respective steps 310 and 410 are initiated in injection mode wellbore 16 and production mode wellbore 17. The injection mode well, wellbore 16, begins operations with step 312 to pump a dielectric oil based fluid sourced from fluid processing system B and pumped by pumping system means E, through flow line 50, through wellhead attachments 84, through annular space 88, through ports 142 and into ambient fluid area 19 to provide the following functions:

a. provide a dielectric fluid as an insulating fluid between DCT surge power transmission and PPE positioning tubular 44 and outer casing tubular 82; and/or b. provide a cooling fluid to cool the DCT surge power transmission and PPE positioning tubular 44 of any resistance heating resulting from conducting high voltage electrical surge currents through the surge power transmission and PPE positioning tubular 44; and/or c. provide a fluid jetting flow to clear any debris and/or gases that may accumulate in spaces 156, 19, and/or 18 due to the effects resulting from discharging the PPE system; and/or d. provide a thermal increase in the ambient fluid temperature in the area 19 and/or area 18 to assist in modifying the MPS cavitation bubble dynamics as is known in the art of generating and controlling cavitation and sonoluminescent fluid dynamics; and/or e. in one embodiment to pump fluid into annular space 18 to generate a static increase of hydrostatic or hydrodynamic pressure in annular space 18; and/or f. in one embodiment circulate fluid into annular space 18 and 106, through flow line 64 and to pumping system E where the fluid is dynamically flowed through a manifold choke (not shown) to induce an increase in the ambient hydrodynamic wellbore pressure by circulating the wellbore annular under flow choking conditions; and/or g. in one embodiment assist to inject fluid into the inter-wellbore formation permeable pathways to induce an inter-well sweeping and production of the formation fluids.

Similarly, production mode well, wellbore 17, begins operations 410 as step 412 that also provides the pumping of a dielectric fluid into annular space 88 of the PPE system 24 placed in wellbore 17 and therefore operates in a similar manner to the operations described in the case of the injection mode well, wellbore 16. The production mode well, wellbore 17, can accommodate the production fluid inflow generated by injection mode well, wellbore 16, sweeping the formation of formation fluids. The production well, wellbore 17, directs inflowing heterogeneous production fluids to the surface for processing by fluid processing system B where it is processed into its various constituents.

During steps 312 and 412, step 314 (step 414 same as step 314) initiates the spin-up of the CAPP G systems compulsator subsystem to generate and store kinetic energy to a predetermined energy level to prepare it for providing an electrical current discharge surge to energize the PPE tool 20 to generate a high power MPS discharge. Briefly, the compulsator (Compensate Pulsed Alternator) embodies the single element philosophy of combining in one element the energy storage, electromechanical energy conversion, and the power conditioning. Compulsator technology is a mature technology used primarily in the high energy density weapons industry to pump high power electrical current surge pulses to such weapons as pulsed lasers and rail guns. The compulsator employs an integrated inductance shielding feature that allows the production of very powerful short rise time (micro-millisecond) electrical power surges current pulses. The compulsator can generate an extensive range of currents, voltages, pulse shapes, and frequencies. The compulsator system is a high energy density pulsed power generation and storage system providing a highly portable pulsed power source. Typical compulsator systems can be housed in oilfield skid type structures that can be transported by typical oilfield trucks. The compulsator is a relatively inexpensive pulsed power source to capitalize, mobilize and operate thus providing an ideal modern pulsed power system for powering a high power PPE system. The compulsator system is described in more detail in step 320.

During steps 312, 314, 412 and 414, step 316 is initiated in the injection mode well, wellbore 16, which can utilize fluid drawn from fluid processing system B in conjunction with pumping system E. Pumping system E pumps a fluid through flow line 64 through a wellhead interconnection (not shown) into wellbore annular space 106 and 18 of wellbore 16. Thereby the injection mode wellbore 16 can be pressurized to inject and/or circulate a fluid through wellbore 16 and/or provide positive pressure in wellbore 16 to force injection and/or circulation of the wellbore fluid into any interconnecting permeable pathways eventually established between the injection mode well and an adjacent production mode well.

Similarly, during steps 312, 314, 412 and 414, step 416 is initiated in the production mode well, wellbore 17, which can utilize fluid drawn from fluid processing system B in conjunction with pumping system E. Pumping system E pumps a fluid through flow line 62 through a wellhead interconnection (not shown) into typical wellbore annular space 106 and 18 of wellbore 17. Thereby the production mode wellbore 17 can be pumped to circulate the inflow of the heterogeneous production fluid forced into wellbore 17 to the surface for processing.

Step 318 (and similarly step 418 when sequenced) initiates the PPE tool spark gap channel 180 preparation. The optimized development of a MPS is achieved through the preparation of a low Ohmic spark gap channel 180 prior to pumping a high power surge current into the spark gap 156. The low Ohmic spark gap channel 180 should intrinsically be lowest resistance point in the PPE circuit and is achieved by using one of three commonly known methods that are well described in the prior art. These methods are a) an exploding wire filament, b) the breakdown and ionization of the dielectric spark gap fluid by the voltage potential across the PPE electrodes, or c) by pumping a vaporous combustible gas through the spark gap channel between the PPE electrodes. The present invention provides novel means of achieving the spark gap channel. Step 318 provides for the initiation of pumping system F to pump a mixture of a dielectric fluid mixture, such as water, an oxidant and an alcohol stored within pumping system F (not shown). The premixed reactant mixture (not shown) is stored within the pumping system F to be pumped as needed by pumping system F through the interior conduit space 46 of surge power transmission and PPE positioning tubular 44, through check valve 170 and forced through the circuitous path of the catalyst pack 160 where the hydraulically turbulent interaction of the reactants with the catalyst chemically produce an exothermic reaction and product temperatures ranging from 100° C. up to approximately 1,500° C. depending on the reactant admixtures and proportions thereof. The reactants are proportionally mixed to produce reaction products reaching a temperature sufficient to generate a fluid product mixture of super-heated, high pressure water vapor plus hydrogen and/or oxygen molecules, depending on the specific reactant, reactant proportions and catalyst used as is commonly known in the art of chemically generating steam. The initiation of the reaction is virtually instantaneous and is controlled and sustained by the operation of the pumping system F in generating a positive differential pressure across the check valve 170 to pump the reactants through the downstream catalyst pack 160. The check valve 170 functions to isolate the reactants from the catalyst pack 160 until the pumping system F forces the reactants through the check valve 170 and thereby prevent any potential back flow of the ambient fluids, from ambient areas 18 and 19, into tubular space 46 preventing potential reactant contamination. The chemical reaction produces a chemically exothermic reactant product stream of a high temperature, high pressure combustible fluid vapor which instantaneously expands and is thereby forced through discharge orifice 158 of the upper electrode 155 and jetted into and across spark gap 156. An at least partially ionized and combustible fluid spark gap channel 180 is thereby formed through the fluid product expansion thus preparing the spark gap channel 180 for a subsequent high power electric surge current pulse to be pumped to efficiently produce a MPS discharge bubble 182. It will be recognized by one skilled in the art that the chemical reaction is self-energizing and does not require an additional heat source to be provided by a power cable from the surface or an unstable flame holder as the unreacted fluid mixture reacts in the presence of a catalyst that is substantially self-energized (i.e.—does not require an additional energy or heat source such as a spark, flame holder, flame, or glow plug to initiate or maintain the reaction and produce the reacted product fluid). Contacting unreacted fluid mixture with the catalyst may occur at a pressure of, for example, about 1 MPa to about 400 MPa. The unreacted fluid mixture may be at a temperature of about 20° C. to about 500° C. The chemically exothermic reaction may be generated by many different fluid mixture and catalyst materials as is known within the prior art of chemically produced steam. The exothermic jetting of a combustible fluid to form the spark gap channel 180 prepares the requisite systemically intrinsic low Ohmic fluid spark gap channel into which a high power electrical surge current can be efficiently pumped to generate an optimal MPS discharge event. The preparation of the spark gap channel 180 by means of an exothermic chemical reaction product being jetted into the spark gap channel 180 with the chemical reactants being delivered through the surge power transmission and PPE positioning tubular 44 inner conduit 46 is a significant improvement over the utility and reliability of the prior art systems.

One alternative embodiment of the present invention to trigger an MPS discharge is to pump a current-conducting fluidized mixture of a dielectric fluid (e.g.—water or a hydrocarbon or a silicon fluid), and an oxidizer (e.g.— potassium permanganate or hydrogen peroxide or ferric oxide) mixed with various current-conducting powdered material (e.g.—a powdered metal or graphite) in a similar manner as described above using pumping system F but without the need for a catalyst pack 158. In this embodiment the action of the current-conducting fluid jetting into the spark gap under pressure imposed by pumping system F is coordinated with the electrical power surge current and thereby the fluidized material pumped into the spark gap area 156 triggers the MPS discharge between the PPE electrodes 155 and 150. The triggering of the MPS through jetting of a current-conducting fluid into the spark gap channel 180 through the surge power transmission and PPE positioning tubular 44 is a significant improvement over the utility and reliability of the prior art systems.

Another alternative embodiment of the present invention to trigger an MPS discharge is illustrated in FIG. 06 as system 600. This embodiment will generate a MPS discharge by means of a surface deployed metal filament 632 of system 600 deployed into and through the center of surge power transmission and PPE positioning tubular 44 and lowered into position at the distal end to surge power transmission and PPE positioning tubular 44. The deployment means utilizes a wire line 610 deployed metal filament 632 enclosed within a dielectric carrier 630 that surrounds and electrically isolates the metal filament 632. The dielectric filament carrier 630 is attached to the distal end of dielectric wire line 610 retrievable plunger means 612 that when positioned in the top of upper electrode 155 the metal filament 632 can be hydraulically pushed into and through upper electrode 155 and into spark gap 156 thus providing a calibrated metal filament in the spark gap 156. The filament can be shorted by application of a high voltage electrical power pulse acting between the upper and lower electrodes to explosively generate a MPS discharge bubble 182. The metal filament 632 is intended to be sacrificial and can be continually replaced in the spark gap 156 by temporarily increasing the hydraulic pressure across the wire line retrievable plunger means 612 and controlling the axial distance deployed by the action of holding back tension on the deployment wire line 610. The wire line retrievable plunger means 612 has position and force sensor (not shown) within it to provide sensor data logging for command and control means and software to control the deployment and successive axial movement of the metal filament 623 to bridge the spark gap 156. These sensors determine the relative position and force exerted upon the metal filament 632 to provide a means to determine when the metal filament 632 has axially extended into and/or mechanically engaged the lower electrode 150 through the action of the hydraulic force upon the wire line retrievable plunger means 612. The wire line 610 that deploys and controls the wire line retrievable plunger means 612 powers, receives and transmits the power and high speed communications from the wire line retrievable plunger system 612. The metal filament 632 can be deployed in approximate 13.0 m sections that can be held in place within the filament carrier 630 end to form a metal filament of several hundred meters. As an example, a 75 m long stacked filament deployment may be consumed in the action of generating an MPS discharge within a spark gap distance of approximately 2 mm per plasma generation event. Therefore the 75 m of metal filament 632 would provide approximately 25,000 MPS discharge events. At a plasma event rate of 0.2 Hertz and operating 24 hours per day, the 75 m long metal filament 632 would last approximately 225 days before requiring replacement. The wire line retrievable plunger means 612 is forced downward as the metal filament 632 is consumed, the wire line retrievable plunger means 612 will latch with the filament dielectric carrier means 630 in preparation to retrieve the wire line receivable plunger means 612 so as to retrieve the dielectric filament carrier means 630. Replacing the metal filament is accomplished by retrieving the wire line retrievable plunger means 612 latched with to the dielectric filament carrier means 630 to surface and installing a new metal filament 632. Resetting the dielectric filament carrier means 630 and re-deploying the wire line retrievable plunger means 632 and the replacement filament rod(s).

Once the spark gap channel 180 has been prepared, pulsed power source G command and control firing circuit (not shown) is triggered to discharge a HVDC power surge current through insulated electrical power transmission cable 30, through insulated electrical connector clamp 32, through the body of surge power transmission and PPE positioning tubular 44, through upper electrode 155, across spark gap channel 180, through lower electrode 150, through outer housing 130, through outer casing 82, through power transmission cable 85 and is captured by pulsed power source G for use or storage thus providing a closed electric circuit for the generation of an MPS discharge. The triggering of the MPS discharge through axially acting hydraulic deployment and operation of a current-conducting metal filament and/or ionized fluid into the spark gap channel 180 through the deployment and electrical transmission tubular 44 is a significant improvement over the utility and reliability of the prior art systems The DCT inner surge power transmission and PPE positioning tubular 44 is designed with a large cross sectional area to minimize resistance loading during the transmission of HVDC. Surge power transmission and PPE positioning tubular 44 cross sectional area may range between 350 mm$^2$ to 4,500 mm$^2$, preferably between 1,500 mm$^2$ to 3,000 mm$^2$. DC voltage transmits through the all the atoms within transmission conductor and therefore the full cross sectional area of the body of the surge power transmission and PPE positioning tubular 44 and not just along the tubular surface area "skin" of the tubular as AC voltage does during transmission. Therefore, the large cross sectional area of surge power transmission and PPE positioning tubular 44 provides less voltage loss and therefore less resistance heating associated with the transmission of the HVDC of the present invention. Therefore the amount of energy that can be transmitted from the surface to the downhole PPE is dramatically increased over the prior art means of powering the PPE through wire line deployed and charged downhole capacitors systems. The DCT inner surge power transmission and PPE positioning tubular 44 serves three unique functions over the prior art. Firstly, the large cross-sectional area of surge power transmission and PPE positioning tubular 44 provides a high strength mechanical deployment and repositioning means to run, retrieve and/or periodically reposition the PPE within the wellbore. Secondly, the large cross-sectional area of surge power transmission and PPE positioning tubular 44 additionally provides the ability to transmit unprecedented levels of HVDC electrical power surge currents to the downhole PPE. Thirdly, surge power transmission and PPE positioning tubular 44 provides a centralized utility conduit to pump and/or convey various means to prepare the spark gap channel 180 and/or to trigger the firing of the MPS discharges or alternately, a means to deploy and operate an explosive filament means of assisting in the generation MPS discharges within the PPE tool 20. The unique combined functions of surge power transmission and PPE positioning tubular 44 provides a significant improvement over the prior art in its capacity to provide a strong and reliable mechanical means to deploy, operate and reposition the PPE tool within the wellbore; to transmit unprecedented energy surge levels to the PPE tool; and means through which to provide reliable spark gap channel preparation and support for reliably generating repetitive MPS discharges.

Once operational step 318 has established the spark gap channel 180, operational step 320 (and similarly in a sequential manner step 420) is initiated by triggering a HVDC surge current discharged from pulsed power source G that flows through electrical transmission line 30, through clamp 32, through surge power transmission and PPE positioning tubular 44 into and through upper electrode 155, through spark channel gap 180, into and through lower electrode 150, into and through outer housing 130, into and through outer casing 82, into and through slip and seal assembly 122, into and through electrical transmission cable 85 and is captured by pulsed power source G.

In one embodiment of the present invention, a pulsed power source G comprises a rotary mechanical means such as a turbine, a fuel-burning rotary engine or an electric motor to rotationally wind up an electrical kinetic energy generator, storage and high cycling surge current discharge means with the potential of providing up to the GJ level of rapid discharge pulsed electrical energy surge currents to power the down hole PPE tool 20 of the present invention. The present invention may utilize electrical surge energy levels between 2.0 kJ to 1.0 GJ, preferably between 1.0 MJ to 50.0 MJ, ideally between 20.0 MJ to 40.0 MJ. The HVDC energy surges are conducted through electrical transmission cable 30, through WS clamp 32, and through surge power transmission and PPE positioning tubular 44 to power PPE tool 20. The HVDC power surge current flowing into the spark gap channel 180 of PPE tool 20 concomitantly produces intensely powerful electromagnetic, acoustic and hydrodynamic surge waves intended to generate formation fractures and formation fluid energization. The MPS generation and resulting phenomenon is well understood and collectively described within the exemplary prior art reference patents listed below, all of which are referenced herein and incorporated hereby in their entirety.

a) U.S. Pat. No. 4,084,638—Titled: "Method of Production Stimulation and Enhanced Recovery of Oil—issued Apr. 18, 1979 to Whiting
b) U.S. Pat. No. 4,074,758—Titled: "Extraction Method and Apparatus—issued Feb. 21, 1978 to Scott
c) U.S. Pat. No. 4,345,650—Titled: Process and Apparatus for Electrohydraulic Recovery of Crude Oil—issued Aug. 24, 1982 to Richard H. Wesley
d) U.S. Pat. No. 4,343,356—Titled: Method and Apparatus for treating Subsurface Boreholes—issued Aug. 10, 1982 to Riggs et al
e) U.S. Pat. No. 4,479,680—Titled: "Method and Apparatus for Electrohydraulic Fracturing of Rock and the Like"—issued Oct. 30, 1984 to Richard H. Wesley et al
f) U.S. Pat. No. 5,397,961—Titled: "Apparatus for Generating a Pulsed Plasma in a Liquid Medium"—issued Mar. 14, 1995 to Richard A. Ayers et al
g) U.S. Pat. No. 6,227,293 B1—Titled: Process and Apparatus for Coupled Electromagnetic and Acoustic Stimulation of Crude Oil Reservoirs Using Pulsed Power Electrohydraulic and Electromagnetic Discharge—issued May 8, 2001 to Huffman et al
h) U.S. Pat. No. 8,220,537 B2—Titled: "Pulse Fracturing Device and Method" issued Jul. 17, 2012 to Leon et al
i) US Patent Application Publication—US 2014/0008073 A1—Titled: "Electrical and Static Fracturing of a Reservoir"—published Jan. 9, 2014 by Bethbeder et al
j) US Patent Application Publication—US 2014/0027110 A1—Titled: "Plasma Source for Generating Nonlinear, Wideband, Periodic, Directed, Elastic Oscillations and a System and Method for Stimulating Wells, Deposits and Boreholes Using the Plasma Source—published Jan. 30, 2014 by Ageev et al The prior art PPE system references exclusively describe and teach the use of capacitor based electrical energy charging and storage means to provide electrical surge currents to power a downhole PPE. The capacitor energy storage system is typically taught as being integrated into the downhole PPE tool system and that the integrated system is taught as being deployed down the wellbore and charged in place by means of a wire line. The Bethbeder patent application, in particular, teaches a wire line deployed, integrated capacitor and PPE tool system, in US Patent Application Publication US 2014/00080073 A1 by Bethbeder et al, wherein Bethbedder infers the use of up to 2.0 MJ of energy to generate MPS discharges. While Bethbeder recognized the need to increase the deployable energy to power PPE for performance reasons, he failed to describe a means to achieve and/or deploy the higher energy density power capacitor system due to the draw backs and limitations as described in the prior art systems as well those limitations listed below. A PPE tool integrated capacitor system of the size necessary to be charged with, be able to store and discharge up to 2.0 MJ or greater of electrical energy would prove to be prohibitively large for downhole deployment by wire line, relatively delicate and unworkable to move, install, maintain, and redeploy for commercial operations. These stated disadvantages teach against the physical, operational and economic practicality of wire line deployed 2.0 MJ PPE integrated capacitor system such as is described by Bethbeder. Further exemplary disadvantages of capacitor based pulsed power systems that have limited their use in field deployed systems are listed below:

a) high energy storage capacitor integrated PPE systems would be prohibitively large to deploy downhole in a typical well drilled for producing hydrocarbon due to relatively low energy density of capacitor designs.
b) high energy storage capacitor integrated PPE systems would prohibitively expensive to deploy due to relatively low energy density of their design.
c) high energy storage capacitor integrated pulsed power systems may catastrophically fail when subjected to voltages or currents beyond their rating or as they reach their normal end of life.
d) high Energy capacitor integrated pulsed power systems are comparatively dangerous as they may retain a charge long after power is removed from a circuit with the potential for dangerous or even potentially fatal shocks or damage connected equipment.
e) high energy capacitor integrated pulsed power systems dielectric or metal interconnection failures may create arcing that vaporizes the surrounding dielectric fluid or material resulting in case bulging, ruptures, or even an explosion causing sever environmental contamination in the wellbore.
f) high energy capacitor based pulsed power systems use of brittle materials such as glass and ceramics as preferred dielectric materials for high voltage capacitor applications may also create significant risk of fracture and subsequent catastrophic shorting when used as a repeatedly mobilized system.
g) high energy capacitor based pulsed power systems use of brittle materials such as glass and ceramics as preferred dielectric materials for high voltage capacitor applications may also create significant risk of fracture and subsequent catastrophic shorting when used in non-vertical wellbores due to stress flexing of the long length of an integrated PPE tool system.
h) The field deployed capacitor based pulsed power systems have a substantially reduced lifecycle due to the systemic stresses encountered during deployment and/or each re-deployment of the system from well to well and site to site.

These stated disadvantages teach against the physical, operational, environmental, and economic practicality of utilizing capacitor integrated PPE tool systems. While one or two prior art references infer or teach the use of capacitor energy greater than 2.0 kJ, there is no teaching on how to achieve the energy densities greater than 2.0 kJ in a wire line deployed, downhole positioned, capacitor power integrated PPE tool system. The prior art systems are thereby limited to low energy PPE MPS discharge apparatus and by extension are very energy limited in the MPS discharge energy available for formation fracturing and/or fluid energization effects that can be achieved.

The ability of MPS discharge surge waves to modify the formation permeability and energize the mobilization of the formation fluids lay in the level and form of energy these waves impart into the formation. It is apparent from legacy information and current commercial operations of the low energy PPE class systems that there is sufficient demonstration of the limited enhancement this class of PPE system can produce to enhance production from resource bearing formation.

What is needed is a surface deployed high energy density means to generate high power electrical discharge surge currents transmitted through a deployment and low Ohmic electrical transmission conductor tubular system to simplify the downhole PPE. The system needs to be able to generate higher power MPS discharges of a magnitude that can generate surge waves that can impart greater levels of energy to generate formation changes. Such a system would be able to generate energetic surge waves at a level that could uniquely be used in various applied methods to generate far field formation permeability modifications and formation fluid mobilization energy at a level that was anticipated but unachievable by the prior art systems.

The present invention provides such a high energy density surface based pulsed power generation system as is needed to generate very high power MPS discharges. The present invention includes the novel use of a Compulsator (Compensated Pulsed Alternator) as its preferred pulsed power source. The compulsator operates on the principle of a steady accumulation of energy followed by its rapid release that results in the delivery of a larger amount of instantaneous power over a shorter period of time, although the total energy is the same. By releasing the stored energy over a very short interval, a process that is called Power Compression, a huge amount of peak power can be delivered to a load. For example, if 1.0 J of energy is stored and then evenly released to a load over 1.0 second, the peak (instantaneous) power delivered to the load would be 1.0 W. However, if all of the stored energy were released within 1.0 µs, the peak (instantaneous) power would be 1.0 MW or 1,000,000 times greater. The compulsator of the present invention operates on the principle of utilizing a relatively low horsepower prime mover to wind up a compulsator system over time to generate and store electrical kinetic energy via a high rotational speed flywheel storage means that is part of the compulsator system. Compulsators recent rapid development as a pulsed power source has been a result of the need to power high-energy density weapons such as rail guns and pulsed lasers. Compulsators are based on the generation of very high rotational tip speeds of its rotor to produce and temporarily store energy for subsequent discharge at very short duration but high levels of power. The compulsator provides integrated inductance shielding to provide the ability to discharge very short duration, high amplitude electrical surge power. This type of rotary-mechanical electrical power generation system is a very compact and sturdy system with a small footprint. Compulsators and their control systems have straightforward and mature designs, are relatively easy to manufacture, components are readily available and they are relatively inexpensive to manufacture, operate and maintain. Compulsators have very rugged designs to withstand the torque generated when discharging very high power at very short durations. The robust mechanical design provides the additional benefit of being capable of frequent field based redeployment without life cycle degradation or meaningful increases in maintenance. Compulsators can be used in individual pulsed power source trains or ganged into multi-compulsator trains. Compulsators can achieve rapid discharge cycling rates. Compulsators can operate in high and low temperature operational environments. Compulsators have long expected operational life cycles estimated to be in the range of 25 plus years. The compulsator is very well suited to provide an oilfield mobile, high energy density pulsed power source for powering the high power PPE system of the present invention.

The typical compulsator wind up period for the present invention may be partial seconds to several minutes depending on the stored energy level desired. The kinetic energy stored by the compulsator for use in the apparatus and methods of the present invention may range from low kJ to multi-GJ. The compulsator has the ability to discharge some or up to a high percentage of the stored kinetic energy in single discharges and/or high Hertz bursts. The operational power compression ratio of the stored kinetic energy wind up time to the discharge time anticipated in the present invention may range from a ratio of 10:1 up to 10,000,000,000:1, preferably between 1,000:1 and 2,000,000:1, and more preferably between 2,500:1 and 1,000,000:1 depending on the desired level of MPS discharge power and MPS discharge cycling time desired. The compulsator's instantaneous power surge current discharges may range from a low of 1.0 kW up to 10's of TW, preferably between 1.0 MW to 10.0 TW, and more preferably between 10.0 MW and 1.0 TW for use in the methods of the present invention. Therefore very high power electrical surge currents discharged from a compulsator train system may be transmitted to a downhole PPE to generate very high power MPS discharges. A compulsator system of the present invention can be operated to generate electrical energy discharge surge pulses in the range from the low energy density levels of the prior art systems to an unprecedented energy level using one or more compulsator trains.

The high power PPE system design and capabilities as taught in the present invention builds on the prior art descriptions, teachings, research, field experimentation and commercial deployment attempts of the low energy density prior art systems. The physics, experimentation and application of MPS discharges to generate electromagnetic, acoustic, and hydrodynamic energetic surge waves are well documented in the reference material cited elsewhere in this specification. The failure of the prior art PPE systems to become an economically significant industrial method of resource production is their limited energy density MPS generated surge waves. The prior art systems limited energy density is a result of approaching the development and deployment of the PPE system pulsed power source using a capacitor that is an integrated component of the downhole deployed PPE system. Therefore, the present invention teaches a number of improvements over the prior art PPE systems.

One such improvement of the present invention over the prior art is the employment of a compulsator pulsed power system. The integrated use of a surface based pulsed power source system, in this case a compulsator system (single or ganged), is to provide an unprecedented level of power compression to power a simplified downhole PPE tool. The compulsator is relatively inexpensive to build, deploy and operate. The inexpensive nature and high energy density capacity of the compulsator system of the present invention provides the ability to power not only very high power individual MPS, but also to be able to sustain repetitive MPS discharges at high cycle rates. This low cost pulsed power source provides the ability to economically sustain repetitively generated MPS discharges. The analogous effect of the repetitive MPS discharges is it would be similar to performing several thousand repetitive high power static pressure formation macro fracturing operations throughout the productive life of the target resource bearing formation, which, of course, would be prohibitively expensive to conduct with conventional equipment.

Another such improvement is the novel use of a large cross section area surge power transmission and PPE positioning tubular 44 to provide the combined duties of a) physically deploying a simplified PPE tool downhole, b) providing a low Ohmic HVDC power transmission tubular to transmit high power electrical surge currents to the PPE tool, and c) provide the conduit for deploying several novel means to prepare a spark gap channel and/or trigger an MPS within the spark gap area 156. The novel use of the surge power transmission and PPE positioning tubular 44 aspect of the present invention provides the ability to transmit high amplitude pulsed power from a variety of surface based pulsed power source options, such as Compulsators, Marx Generators, Capacitors, Explosively Pumped Flux Compression Generators, EMP generators, Pulse Forming Networks and/or Linear Transformer Driver depending on the desired field application. This issue is hugely important as it has become obvious that the most significant prior art low power PPE systemic limitation for achieving enhanced formation modifications and fluid energization has been the low power MPS discharges due to the limited energy storage capacity and operation. It has been demonstrated that the low power PPE systems of the prior art have not achieved the economically significant formation modification effects that were taught and/or claimed. The present invention, on the other hand, can generate unprecedented levels of high power MPS discharges that will generate much greater surge wave energy levels and therefore a much greater opportunity to produce formation modifications and fluid energization that are necessary to drive economically significant enhanced resource bearing formation production effects.

Another such improvement of the present invention over the prior art teachings is the novel and more reliable use of a chemical spark channel preparation means and/or any of the alternatives described as alternate embodiments elsewhere in this specification.

It is these described improvements of the present invention that provide improved tools and systemic means to generate cost effective, repetitive, high power MPS discharges that enables its applied use in various novel methods to achieve economically significant enhancement of the production of many types of resource bearing formations.

During operational step 320 a HVDC electrical energy surge current is pumped into spark gap channel 180 where the energy acts on the ionized fluid within the spark gap channel 180. The energy surge acts to form a MPS discharge that concomitantly produces electromagnetic, acoustic, and hydrodynamic energy surge waves by the processes known within the art and is well described in the collective prior art teachings cited elsewhere in this specification. The concomitantly generated, but different types of high power surge waves travel radially at different velocities therefore act serially on the formation in different but serially complimentary ways. The explosively expanding MPS discharge energy surge waves interacts with the hydraulically coupled ambient fluid 18 and 19 to generate energy surge waves 190 (electromagnetic), 191 (acoustic), and 192 (hydrodynamic). The ambient fluid 18 and 19 can be comprised of nearly any type of fluid (e.g.—oil, diesel, a week acid, formation water, KCL brine, or water) to convey the MPS discharge generated energetic surge waves through and then into the formation 14.

The broad range of MPS energy levels that can be generated by the high power PPE of the present invention allows the surge waves to be generated as either non-shock or shock waves. These energetic waves act upon the formation to impart their energy into the formation and the various fluids in different but complimentary ways. The actions of the dynamic energy waves acting upon the hydrocarbon bearing formation progressively produce a high density of interconnected micro and mini scale fractures that form circuitous macro scale permeability pathways 260 as a function of the repeated MPS discharge effects. Each time the high power PPE MPS is discharged, additional micro and mini scale fractures are generated and increasing integrated into macro scale permeable fracture systems within the bulk formation. The result of repetitively discharging high power PPE MPS discharges is a progressive changing of the aggregate circuitous pathways of macro scale permeability pathways illustrated as progressive formation fracture system 261. Repeated generation of the high power PPE MPS discharges continues to progressively increase the micro-mini fracture density and change the macro scale permeability pathways thereby providing time varying and aggregately increasing hydrodynamic access to greater volumes of the OIP.

Steps 320 and 420 are sequentially cycled in a repetitive and bidirectional manner until steps 322 and 422 generate inter-well formation dilatation, micro-mini fracturing, hydro-shearing, and/or spallation effects produce at an initial inter-well fluid macro scale permeability systems 260 that will support inter-well fluid circulation. Establishing inter-wellbore circulation is of major importance as it provides a means to induce an efficient directionally forced sweeping of the formation fluids and/or provide an increase in inter-wellbore formation fluid forced mobilization through rheological enhancements. The present invention uniquely provides a combination of repeated magnetohydrodynamic energetic surge waves in combination with inter-wellbore fluid circulation induced from a surface sourced injected sweeping fluid, that in combination, the two concurrent processes add spatially dynamic strategic energy to the production process. The combination of the two processes increase the volume of formation resource that can be produced as well as increasing the rate at which the resource can be produced beyond that achievable through conventional production methods. The progressive development of additive inter-wellbore macro scale permeability pathways, such as is illustrated as permeable system 260 progressively migrating to permeable system 261, provides the ability to induce inter-wellbore circulatory flow to hydraulically flush and produce the hydrodynamically assessable oil. In combination with the injection mode well induced inter-wellbore flow, two hydrodynamic surge pulses are serially generated as a result of each MPS discharge. The MPS discharge initially generates a ionized vapor bubble growth that produces a hydrodynamic impulse surge wave within the ambient fluid in the wellbore, typically a liquid. This impulse surge wave is transferred through the wellbore fluid into the surrounding formation, initially as a longitudinal shock wave generating a first hydrodynamic impulse wave. As the bubble grows to an equilibrium temperature and/or pressure state, the bubble implodes according to imploding cavitation bubble dynamics and thereby generating a second, but lesser energetic, hydrodynamic impulse wave upon bubble collapse. The repetitive MPS generated hydrodynamic impulse waves, in a large part, can mitigates hydraulic short circuiting within the formation matrix permeable pathways such as has commonly occurred in a production flooding process and is commonly known as hydraulic fingering. The MPS discharge generated hydrodynamic impulse waves act on the formation fluids within the permeable pathways to produce a jump-state velocity related pressure and temperature surge wave front. The surge wave front effectively energizes a surge pulse to more uniformly mobilize the heterogeneous fluids within the formation permeable pathways over a broad frontal area within the circuitous permeability pathways 260 and 261. Thus, as the dynamically changing mini-macro scale permeable pathways 261 adjust with each discharge of the high power PPE tool, increasing the volume of oil that becomes exposed and surge pushes the oil into an adjacent production wellbore to be produced to the surface.

Well bores 16 and 17 are strategically spaced 15 to ensure inter-well bore circulation can be established using the high power PPE MPS discharges to generate formation macro-permeability pathways 261. The well bore spacing 15 is determined through theoretical and/or empirical computational analytical processes in which theoretical algorithms are computer modeled and improved through the acquisition, analysis and further computer modeling of field data from legacy prior art and/or progressive field operations. The following types of variables and/or data are considered in determining wellbore spacing:

1. Formation Rock Properties:
   a. Formation geology
   b. Formation petrology
   c. Formation depth
   d. Formation pressure drive type
   e. Formation density
   f. Formation spatial heterogeneity
   g. Formation heterogeneity types
   h. Formation porosity
   i. Formation permeability
   j. Formation in situ fluid type and properties
   k. Formation pore pressure
   l. Formation temperature
   m. Formation break down pressures
   n. Formation acoustic impedance
   o. Formation electromagnetic impedance
   p. Formation fluids hydrodynamic impedance
   q. Formation combined over-all impedance
   r. Formation yield strength
   s. Formation compressive strength
   t. Formation tensile strength
   u. Formation's Young's Modulus
2. Electrical Surge Current Properties:
   a. Type of pulsed power source
   b. Type of plasma emitter spark gap channel
      i. non-prepared
      ii. ionized
      iii. filament
   c. Electrical surge current properties
      i. Stored energy level
      ii. Power compression range
      iii. Surge current power wave form
         1. amplitude
         2. over-all duration (energy spread)
         3. electrical power rise and drop off durations
      iv. Frequency of surge current cycling
3. Wellbore ambient fluid and properties:
   a. Formation sweeping fluid type and properties
   b. Active fluid phase
   c. Fluid combinations and properties
   d. Additives
      i. Rheological enhancement additives and properties
      ii. Temperature modification additives and properties
      iii. Pressure modification additives and properties
      iv. Additive triggers and properties Therefore, various algorithms can be established and used to determine optimized inter-well bore distance 15 for a given set of targeted and operational conditions that will result in establishing and sustaining the important inter-wellbore circulation process of the present invention.

Successful operation of steps 322 and 422 provides the means for step 350 to become operational by pumping a formation sweeping fluid from fluid processing system B through flow line 64, through casing and slip assembly 122, into and through annular space 106 and 18. The injected sweeping fluid can be a single fluid type such as water, oil based fluid, liquid $CO_2$, liquid nitrogen, liquid propane and/or any combination of fluids and additive materials that will support or promote the efficient fracture generation, fracture propping, fracture extension, and/or the mixing, entraining, and production of the heterogeneous formation and sweeping fluid mixtures. The injection fluid pumped into injection mode well 16 flows into and through the initial inter-wellbore macro scale permeable fracture system 260 and subsequently through progressively developed macro scale permeable fracture system 261 into and through production mode wellbore 17. Operational step 352 produces the heterogeneous combined sweeping and formation production fluids and materials to surface and into flow line 62, to be flowed into pumping system E and pumped as necessary through flow line 66 where operational step 353 provides for the production fluid processing system B to process the produced heterogeneous fluids. Step 353 processes the production fluids into a) marketable fluids and/or materials, stored within storage system A; and/or b) reusable fluids and/or materials, stored within storage system C; and/or c) disposable fluids and/or materials stored within storage system D. The fluid processing system B processes the heterogeneous production fluids and materials through a production fluid processing subsystem equipment group (not shown) that may be comprised of or be selected from any typical combination of production fluid processing equipment such as heaters, treaters, gravity separation units, fractionation units, cyclone separation units, membrane separation units, solvent extraction units, cryogenic separation units, liquefaction units, and/or pyrolysis treatment unit to assist in obtaining the various constituents of the produced heterogeneous fluid.

In step 360, the operations of the injection and production mode wells can be switched as desired to provide the ability to redirect the injected sweep fluid flow direction to optimize production of the heterogeneous fluids. One such example may be that during the generation of dynamically adjusting permeability, solid particles (production fines) may be dislodged and therefore freed to be mobilized through the hydrodynamic action of the sweeping fluid. If the fluidized particles accumulate and disrupt the directional injection fluid flowing in one inter-well direction, the well modes can be operationally reversed to attempt to better optimize the production of the heterogeneous formation fluid flow.

Although a preferred embodiment of the present invention has been described in terms of stimulating and producing an oil resource bearing formation, is to be understood that the present invention is not limited to the application described but can be applied to many other types of resource bearing formations. Such applications are not limited to, but can be further illustrated by a brief exemplary varied description of a few other resource production applications.

The high power PPE system can be used in novel ways to improve the access and production of Geothermal Energy. Geothermal energy is derived from three categories of resources a) Geo-Exchange or Ground Source Geothermal Heat systems; b) Hydro-Thermal Geothermal Heat systems; and c) Enhanced Geothermal Systems (EGS) or Hot Dry Rock (HDR) Geothermal systems.

Geo-Exchange or Ground Source Heat Systems use the earth as a heat source (in the winter) or a heat sink (in the summer). This design takes advantage of the moderate temperatures in the ground to boost efficiency and reduce the operational costs of heating and cooling systems. Ground source heat pumps are also known as "geothermal heat pumps" although, strictly, the heat does not come primarily from the center of the earth, but at this level more appropriately from the sun. They are also known by other names, including earth-coupled and earth energy systems. The engineering and scientific communities prefer the terms "Geo-Exchange" or "ground source heat pumps" to avoid confusion with traditional geothermal power, which uses a high temperature geothermal heat source to generate electricity or in direct heat use systems. Ground source heat pumps harvest heat absorbed at the earth's surface from solar energy. The temperature in the ground below 20 feet is roughly equal to the mean annual air temperature at that latitude at the surface.

Hydro-Thermal Geothermal heat systems generate electricity and direct heat from natural convective subsurface hydrothermal resources where naturally occurring heat, water, and rock permeability are sufficient to allow energy extraction.

EGS generates geothermal electricity without the need for naturally convective hydrothermal resources. By far, the most geothermal energy within reach of conventional techniques is in dry and impermeable rock. Typically, EGS technologies enhance and/or create geothermal resources in this Hot Dry Rock (HDR) through 'hydraulic stimulation'. When natural formation cracks and pores do not allow economic flow rates, the HDR permeability can be enhanced by pumping pressurized cold water down an injection well into the rock. The injection increases the fluid pressure in the naturally fractured rock, generating shear events that enhance the system's permeability. Hydro-Shearing is the predominant mechanism for natural fracture dilation in HDR. As there is a continuous pressurized circulation established between well bores drilled into an artificially generated HDR geothermal reservoir, neither high permeability nor are proppants required to maintain the fractures in an open dilated state. This process is termed hydro-shearing perhaps to differentiate it from a similar static procedure that is substantially the same process and is known as hydraulic tensile fracturing as used in the oil and gas industry.

In numerous embodiments, the present invention can be applied to each of the three categories of geothermal heat mining generated from a single well bore system. In the geothermal application, the high power PPE system can be deployed into a single well bore as shown in FIG. 02 and operated in a manner to induce a radial stress cage with a highly rubblized near well bore area. The PPE tool can be used to circulate a heat absorbing fluid to act as a heat mining fluid that is circulated from the bottom of the well bore, forced through the rubblized material and eventually to the surface where the heat is mined for various purposes depending on the temperature available and the end use purpose such as heating and cooling surface fixtures, equipment, houses, buildings, generating or assisting in the generation of electricity. As the wellbore heat is draw down or mined to a threshold temperature near the minimal economical limit for use in the surface application, additional well bore heat energy can be accessed and mined by increasing the high power PPE tool operational energy to a level that when operated it will increase the wellbore stress cage radial diameter and rubblized area to provide an increase in the high temperature surface area accessible. The well bore stress cage may be acted upon by formation matrix and/or wellbore thermal stresses that will tend to spall the formation matrix well bore wall thereby exposing addition high heat surfaces. As the heat mining fluid is being pumped from the bottom of the well bore towards the surface through the rubblized well bore material, use of the high power PPE to provide periodic hydraulic pulses will enhance the ability of the heat mining fluid to full traverse the rubblized rock through pressure pulses forcing the heat sweeping fluid to flow more effectively through the circuitous paths around the rubblized rock material. Periodic repetitive high power PPE surge waves may be generated to act on the stress cage and rubblized rock material area to further break down the rubblized material near the wellbore into progressively smaller grades of material sizes which exposes an increased high heat density rock surface area. The various high power PPE systems can be scaled to meet the specific needs of each category of geothermal heat mining and/or heat syncing.

In one embodiment, the present invention can also be applied to each of the three categories of geothermal heat mining generated from a two or more wellbore high power PPE spread. As described in the system and process to produce productive formation fluids such as oil, the same general equipment system and processes can be utilized to generate inter-well dilatation, fracturing, hydro-shearing, spallation, wellbore or reservoir stress cage generation and modification and forced circulation between two or more well bores to mine heat. In the geothermal mining case, the circulating fluids would provide a heat sweeping fluid to mine the formation matrix of heat. One aspect of this approach to geothermal heat mining is that the high power PPE surge waves do not need additives such as tracers, friction reducers, diverters, etc. as used in the more common and/or emerging methods for the generation and mining of geothermal reservoirs. The various high power PPE configurations can be scaled to meet the specific needs of each category of geothermal heat mining and/or heat syncing.

The high power PPE system is a novel process to conduct more efficient Solution Mining operations. Aspects of the embodiments of the present invention provide a method and apparatus to provide a means of conducting improved solution mining operations. An embodiment of the present invention may generate an initial and continually increasing productive formation matrix permeability breakthrough, between two or more specifically spaced well bores, which permeable pathways provide a means to bidirectionally circulate fluid from one wellbore to one or more adjacent wellbores. In this manner an increased leaching, fluidization and/or sweeping of a solution fluid and/or fluidized formation material entrained fluid can be flowed to a production mode wellbore to be produced to the surface for processing the produced fluid into marketable materials and/or fluids, reusable materials and/or fluids and disposable materials and/or fluids. The initial permeability breakthrough is generated by means of repeated bidirectional firing of high power PPE system placed within each of two or more wellbores as described for the oil bearing reservoir earlier in this specification. The high power PPE system can generate very high amplitude surge waves. The bidirectional sequenced surge waves may be forced into a resource material bearing formation between the two of more well bores to generate an initial permeability breakthrough between the two or more wellbores that will support inter-well fluid circulation. Upon achieving the initial permeability breakthrough, additional and repeated bidirectional surge waves may continue to generate an aggregately increasing density of interconnected formation fractures and formation dilatation over time to aggregately increase the hydraulic access to an increasingly higher level of the formation matrix material or minerals within the resource bearing formation matrix. Continued discharges of the high power PPE system may continue to generate an abundance of small formation material particles and/or chips that may be fluidized as a result of the circulation fluid rheological properties that can be generated by the operation of the high power PPE MPS discharges in combination with sweeping fluid hydrodynamics as explained elsewhere in this specification. Coincidental to the reoccurring bidirectionally discharging of the high power PPE system and once inter-well permeability has been established, a formation matrix leaching and/or sweeping fluid is sequentially and bidirectionally pumped through the formation permeable pathways between injector and production mode wellbores. This sweep fluid pressure floods between the two or more well bores to leach and sweep the in situ material and/or minerals into a production mode wellbore to be produced to the surface. Each of the two well bores may alternately act as an injector mode and then in a production mode wellbore to provide bidirectional wellbore to wellbore flow to mitigate, among other events, the whole or partial blocking of the permeable fracture pathways by produced formation fines or larger particle accumulations that may block permeability while flowing in one direction. The multi-constituent heterogeneous production fluid may be produced to the surface through the production mode wellbore. At the surface, the produced fluids will be processed to separate the constituents of the produced fluid into marketable products, reusable products and discarded products. In this manner a greatly increased volume of the materials or minerals can be produced in a much shorter time period when compared to conventional solution mining production methods. Data acquisition and command-and-control systems and software is used to monitor and control the operational sequences and functions of the method and apparatus of this invention. The ability to recover a greater amount of the materials or minerals over a relatively shorter time frame than can be achieved by conventional production means provides a significantly increased value capture per unit volume of productive formation through the use of the method and apparatus of the present invention when compared to conventional production means.

The high power PPE system is a novel means to be used in producing the vast worldwide Methane Clathrates (MC) bearing formations. MC is comprised of frozen water with various hydrocarbon molecules, predominantly methane, trapped within the frozen lattice structure of the water. These MC are formed and found in low temperature environments of the deep ocean waters and in the permanent regions in which permafrost exist. The methane can be liberated from in situ MC through either lowering the formation pressure containing the MC and/or heating the formation containing the MC. The high power PPE system can provide MPS discharge generated shock waves that can act to provide both formation pressure adjustments in combination with formation temperature increases from the energy imparted as MPS discharge generated shock waves pass through the frozen MC bearing formations. Further, the use of the high power PPE in an inter-well mode as previous described elsewhere in this specification, the MC bearing formation can be flowingly produced to produce the methane gas. Thus the high power PPE system provides a novel solution to be able to produce the vast worldwide MC resources that currently have no economically feasible means to produce it.

Additionally, the high power PPE system is a novel means to be used in producing the vast worldwide organic Kerogen resources, typically contained geological formations commonly known as Oil Shales within the Oil and Gas Industry. Kerogen is an organic precursor material to form oil and gas products. It is commonly known that in situ Kerogen can be converted into hydrocarbons through appropriate formation heating. The high power PPE system of the present invention can be employed to generate permeability in Kerogen bearing formations at levels that provide a means to assist in injecting various fluids to either chemically react to generate in situ heat to convert the Kerogen or to a inject a heated fluid to convert the in situ Kerogen to hydrocarbon products that can be produced by means of the system and methods of the present invention. Thus the high power PPE system and methods of the present invention provide a novel solution to be able to convert and produce the vast worldwide Kerogen resources that currently have no economically feasible means to produce it.

Although the invention has been described in detail for the purpose of illustration, it is to be understood that such detail is solely for that purpose and that the invention is not limited to the disclosed embodiments, but, on the contrary, is intended to cover modifications and equivalent arrangements that are within the spirit and scope of the appended claims. As an example, it is to be understood that the present invention contemplates that, to the extent possible, one or more features of any embodiment can be combined with one or more features of any other embodiment.

All publications and patents mentioned herein are hereby incorporated by reference in their entirety as if each individual publication or patent was specifically and individually incorporated by reference. In case of conflict, the present application, including any definitions herein, will control. While specific embodiments of the subject invention have been discussed, the above specification is illustrative and not restrictive. Many variations of the invention will become apparent to those skilled in the art upon review of this specification. The full scope of the invention should be determined by reference to the claims, along with their full scope of equivalents, and the specification, along with such variations.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by the present invention. The terms "a" and "an" and "the" used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the invention and does not pose a limitation on the scope of the invention otherwise claimed. No language in the specification should be construed as indicating any non-claimed element essential to the practice of the invention.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrated as only illustrative and not restrictive.

What is claimed:

1. A method of generating an electric arc within a well drilled into a given geological formation, the method comprising steps of:
   a. situating a surface-based electrical power source system (PPS) adjacent a wellbore having a surface, wherein the PPS comprises a primary power source;
   b. positioning a plasma emitter tool (PET) in the wellbore at a point in the geological formation, wherein the PET is coupled to a distal end of a tubular extending downwardly from the surface of the wellbore, the tubular including a tubular wall;
   c. generating electrical energy from the PPS;
   d. storing said electrical energy in the PPS; and
   e. transmitting said electrical energy via pulses of electrical energy surge current through the tubular wall from the PPS to the PET, such that electromagnetic, acoustic, and hydrodynamic energy waves are transmitted from the PET.

2. An apparatus for generating an electric arc within a well drilled into a geological formation, the apparatus comprising:
   a. a surface-based pulsed power source system (PPS) deployed outside the well;
   b. an electrical power transmission tubular (PTT) electrically coupled to the PPS, the PTT comprising:
      i. a tubular body through which electrical power flows from the PPS to a downhole plasma emitter tool (PET); and
      ii. an internal conduit defined by the tubular body, the internal conduit configured to receive fluid from a fluid flow system, such that the fluid is enabled to flow through the internal conduit, wherein the PTT extends to the PET; and
   c. the PET system electrically coupled to the PTT, the PET comprising a first electrode and a second electrode, wherein the first electrode and second electrode form a spark gap therebetween, the first electrode and the second electrode configured to generate an electric arc that generates electromagnetic waves, acoustic waves, and hydrodynamic waves.

3. The apparatus of claim 2, wherein the tubular body is configured to conduct an electrical current from the PPS to the PET.

4. The apparatus of claim 2, wherein the PET is mechanically suspended by the PTT.

5. The apparatus of claim 4, wherein the PTT is configured to adjust the relative position of the PET within the well to operate the PET at various measured depths and/or specific azimuthal positions.

6. The apparatus of claim 5, wherein the PTT is mechanically configured to provide axial force and torque for deployment, positioning, and rotation of the PET.

7. The apparatus of claim 2, further comprising a tubular cap mechanically coupled to the PTT, wherein the tubular cap is coupled to the fluid flow system, such that the tubular cap enables the fluid to flow into the internal conduit.

8. The apparatus of claim 2, further comprising an induction apparatus disposed between the PPS and at least one of the first electrode and the second electrode.

9. The apparatus of claim 2, wherein the PTT extends from outside the well to the PET system.

10. The apparatus of claim 2, wherein the electric arc is a magnetohydrodynamic plasma spark (MPS).

11. The apparatus of claim 2, wherein the electromagnetic waves, acoustic waves, and hydrodynamic waves modify adjacent geological formation.

12. A method of generating an electric arc within a well drilled into a geological formation, the method comprising:
   a. charging and storing a predetermined amount of energy within a surface-based pulsed power source system (PPS), wherein the PPS is disposed outside the well;
   b. discharging the predetermined amount of energy from the PPS;
   c. transmitting the predetermined amount of energy through an electrical power transmission tubular (PTT) to a downhole positioned plasma emitter tool (PET) located within the well, wherein the PTT is electrically coupled to the PPS, the PTT comprises a tubular body configured to conduct an electric current from the PPS to the PET, the tubular body defining an internal conduit configured to receive fluid from a fluid flow system;
   d. receiving the predetermined amount of energy by the PET, wherein the PET comprises a first electrode and a second electrode configured to form a spark gap therebetween, wherein at least one of the first electrode and second electrode is electrically coupled to the PTT; and
   e. generating an electric arc between the first electrode and second electrode so as to produce electromagnetic waves, acoustic waves, and hydrodynamic waves.

13. The method of claim 12, further comprising adjusting the relative position of the PET within the well by the PTT to operate the PET at various measured depths and/or specific azimuthal positions, wherein the PET is mechanically suspended by the PTT.

14. The method of claim 13, wherein the PTT is mechanically configured to provide axial force and torque for deployment, positioning, and rotation of the PET.

15. The method of claim 12, wherein the PTT further comprises a tubular cap mechanically coupled to the PTT, wherein the tubular cap is coupled to the fluid flow system, such that the tubular cap enables the fluid to flow into and through the internal conduit.

16. The method of claim 12, further comprising generating a magnetic field pulse via an induction apparatus disposed between the PPS and at least one of the first electrode and second electrode.

17. The method of claim 12, wherein the electromagnetic waves, acoustic waves, and hydrodynamic waves modify adjacent geological formation.

18. The method of claim 12, wherein the electric arc is a magnetohydrodynamic plasma spark (MPS).

* * * * *